United States Patent
Jang

(10) Patent No.: US 6,985,193 B2
(45) Date of Patent: Jan. 10, 2006

(54) LIQUID CRYSTAL DISPLAY DEVICE AND METHOD FOR MANUFACTURING THE SAME

(75) Inventor: Yong-Kyu Jang, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 137 days.

(21) Appl. No.: 10/055,883

(22) Filed: Jan. 28, 2002

(65) Prior Publication Data

US 2002/0145694 A1 Oct. 10, 2002

(30) Foreign Application Priority Data

Jan. 29, 2001 (KR) .......................................... 2001-4087

(51) Int. Cl.
*G02F 1/136* (2006.01)

(52) U.S. Cl. .......................................... 349/43; 349/152
(58) Field of Classification Search ................. 349/113, 349/149, 152, 139; 257/59; 438/30
See application file for complete search history.

(56) References Cited

U.S. PATENT DOCUMENTS

| | | | | |
|---|---|---|---|---|
| 5,408,345 A | | 4/1995 | Mitsui et al. .................. | 359/59 |
| 5,418,635 A | | 5/1995 | Mitsui et al. .................. | 359/70 |
| 5,610,741 A | | 3/1997 | Kimura ....................... | 349/113 |
| 6,008,065 A | * | 12/1999 | Lee et al. ..................... | 438/30 |
| 6,038,003 A | * | 3/2000 | Kim ........................... | 349/43 |
| 6,406,949 B1 | * | 6/2002 | Kim ........................... | 438/159 |
| 6,466,286 B1 | * | 10/2002 | Seo ............................. | 349/113 |
| 6,476,895 B1 | * | 11/2002 | Kwak et al. .................. | 349/123 |
| 6,650,394 B1 | * | 11/2003 | Kim et al. ..................... | 349/158 |

FOREIGN PATENT DOCUMENTS

WO        10062954       5/2000

* cited by examiner

*Primary Examiner*—Kenneth Parker
*Assistant Examiner*—David Y. Chung
(74) *Attorney, Agent, or Firm*—McGuireWoods LLP

(57) ABSTRACT

An LCD device having improved connection stability concerning a COG, a COF or an FPC and a method for manufacturing the LCD device are disclosed. A pixel including a TFT as a switching device is formed at a central portion corresponding to an active region of a substrate. A gate and a data input pads are formed at a peripheral portion corresponding to a pad region of a substrate. An organic insulation layer is formed on the whole surface of the substrate having the TFT the pads thereon. A rugged structure is formed on the organic insulation layer for forming a rugged reflection electrode by exposing and developing the organic insulation layer. An organic insulation layer is formed to reduce a step between the pads and the portion adjacent to the pads. A single organic insulation layer or double organic insulation layers can be formed. A connection failure between the pads and the COG, the COF or the FPC can be greatly reduced since the height difference of the organic insulation layer between the pads the portion adjacent to the pads can be minimized through the exposing and the developing processes. Also, an electrical short between the pads can be prevented because the organic insulation layer is interposed between the pads.

37 Claims, 20 Drawing Sheets

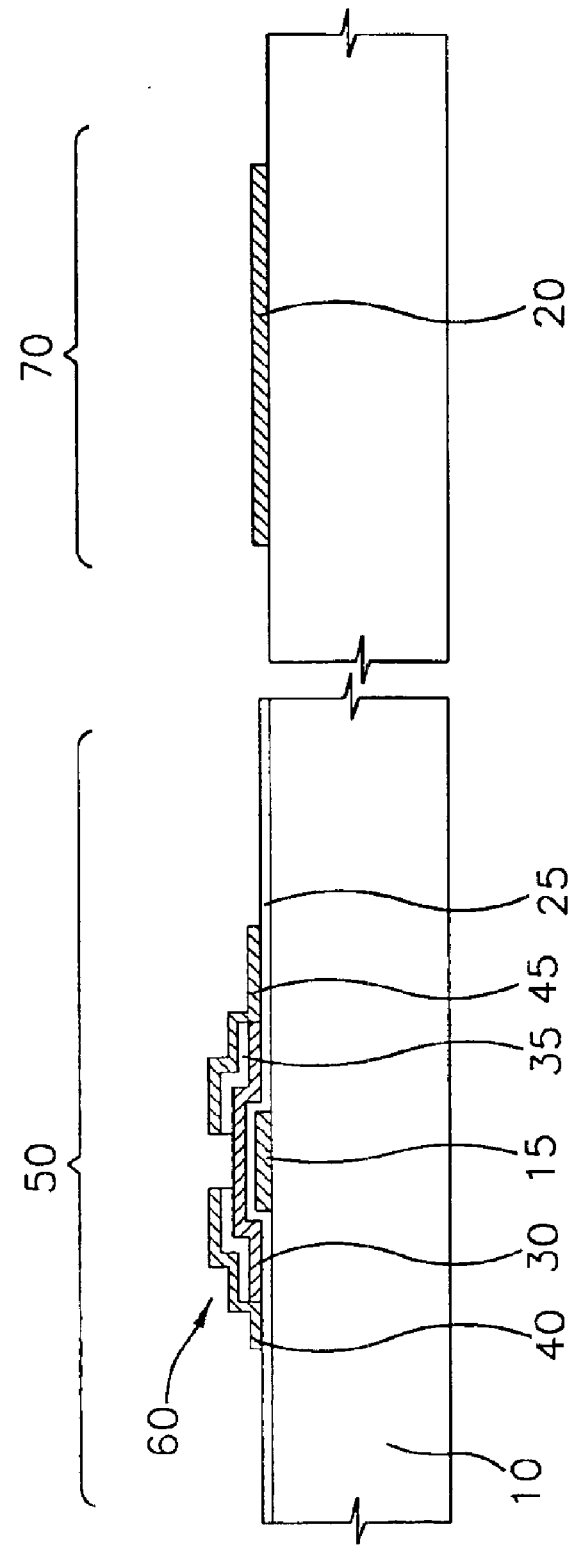

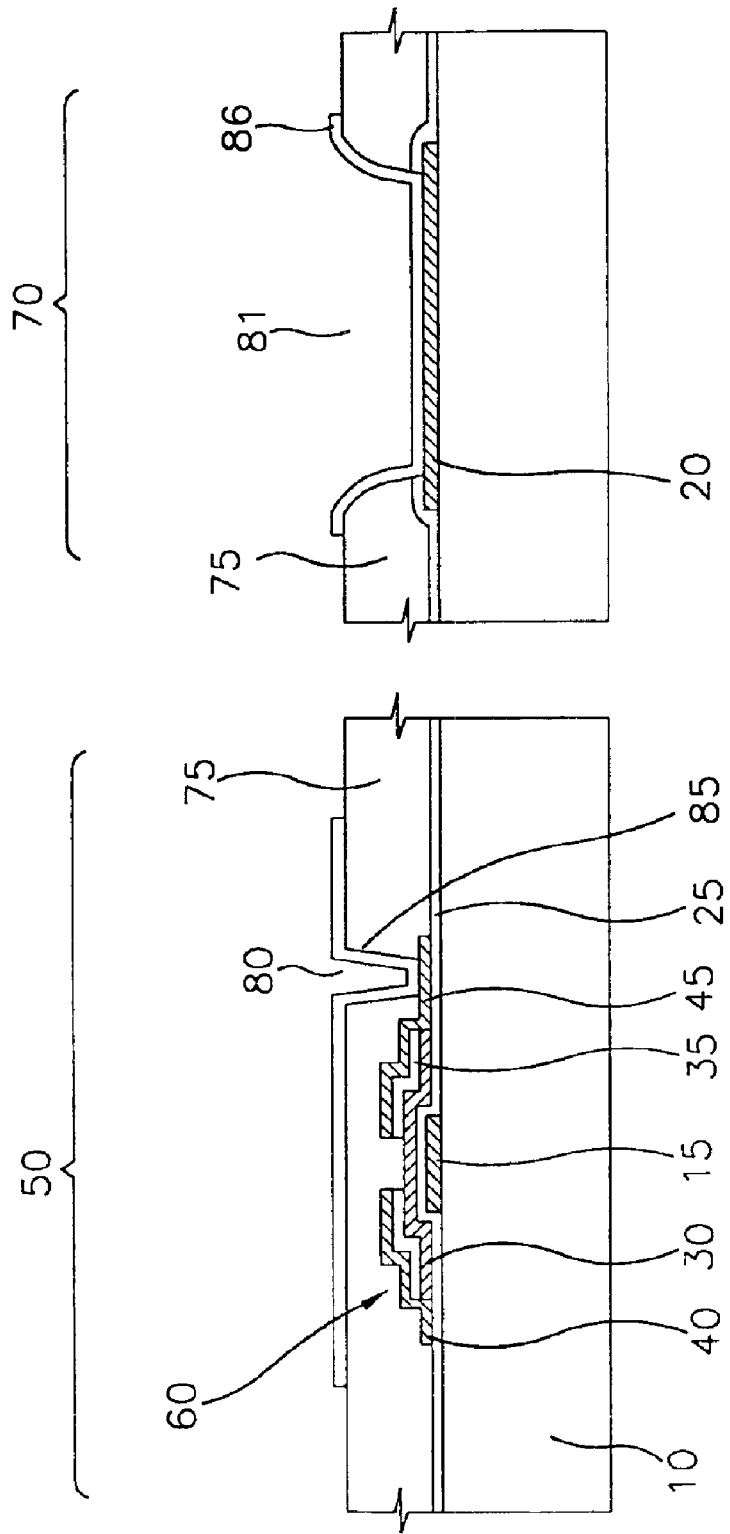

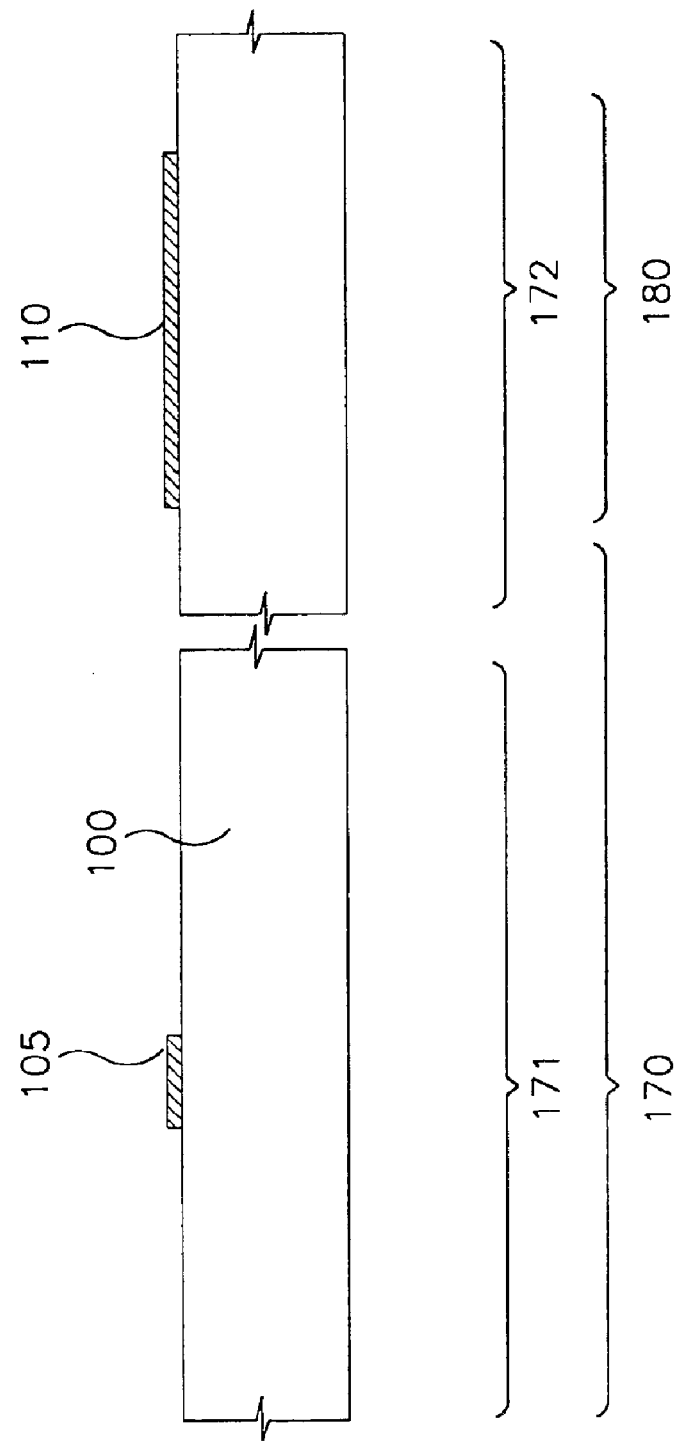

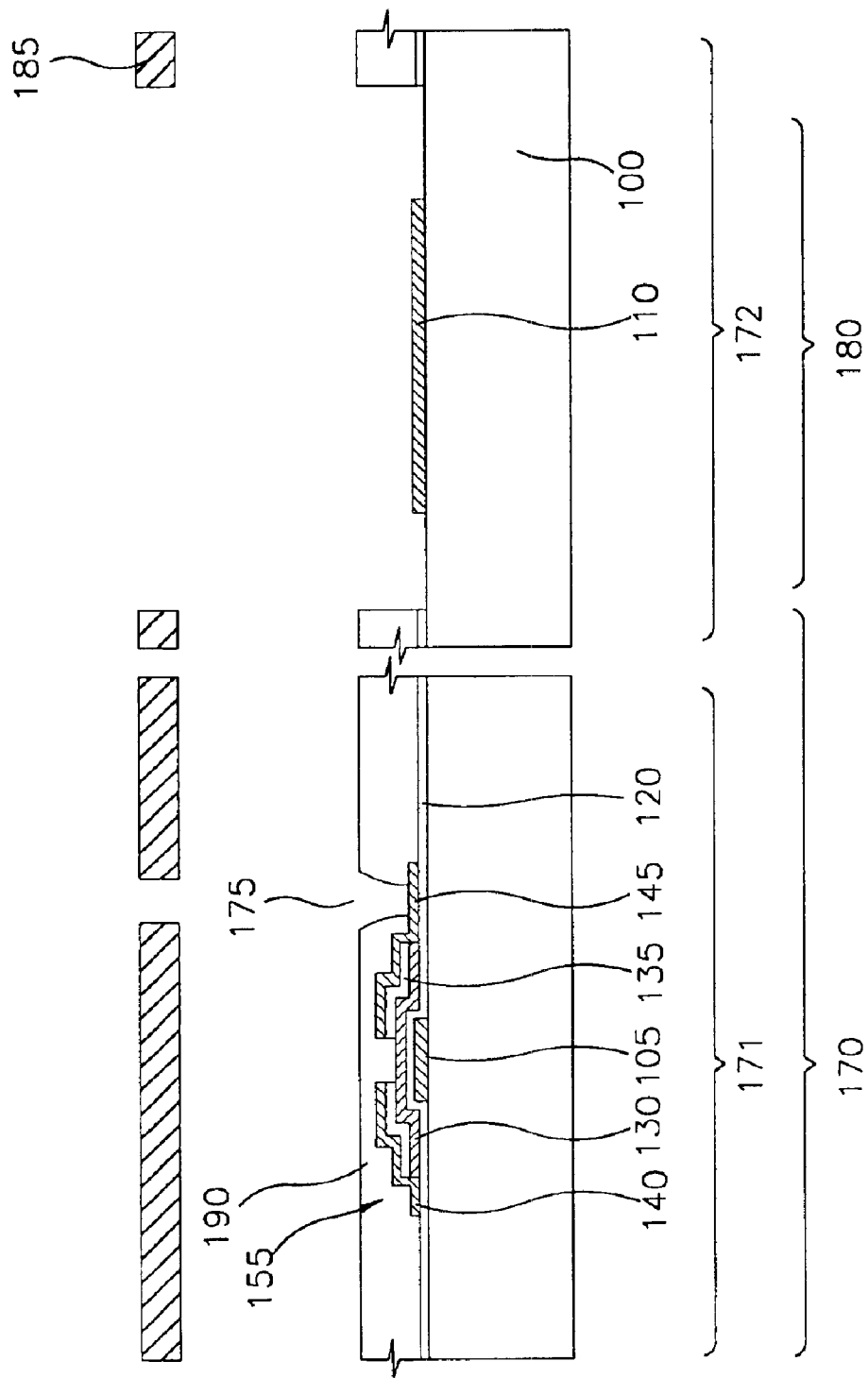

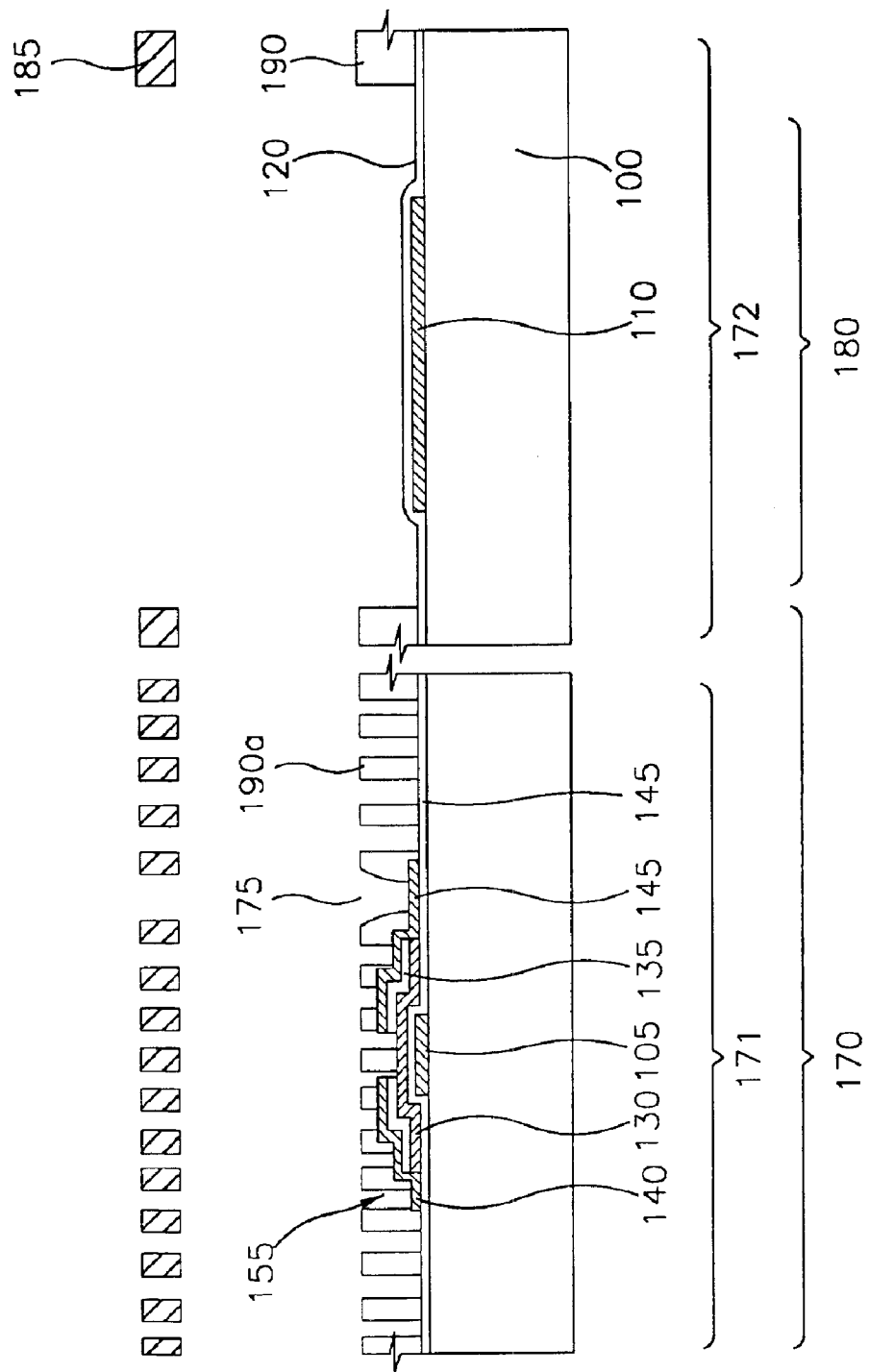

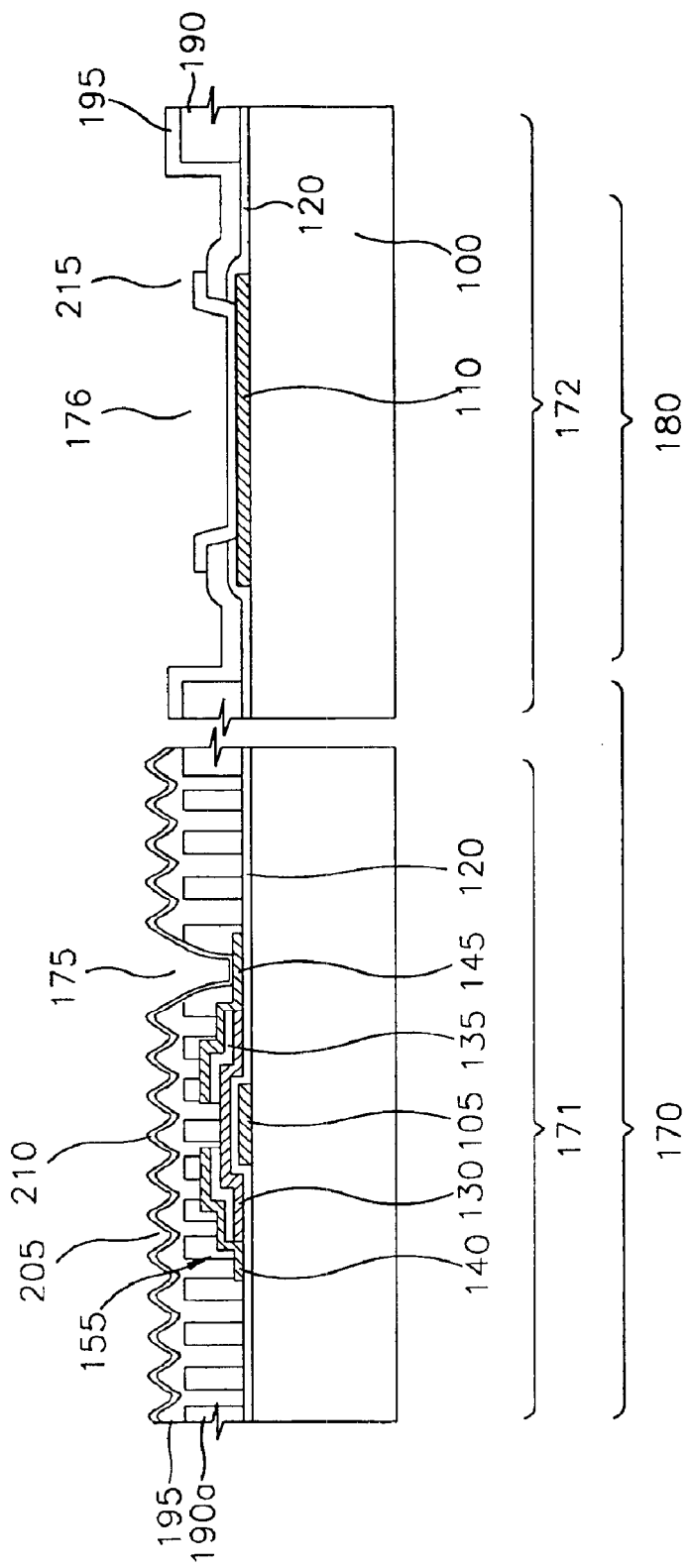

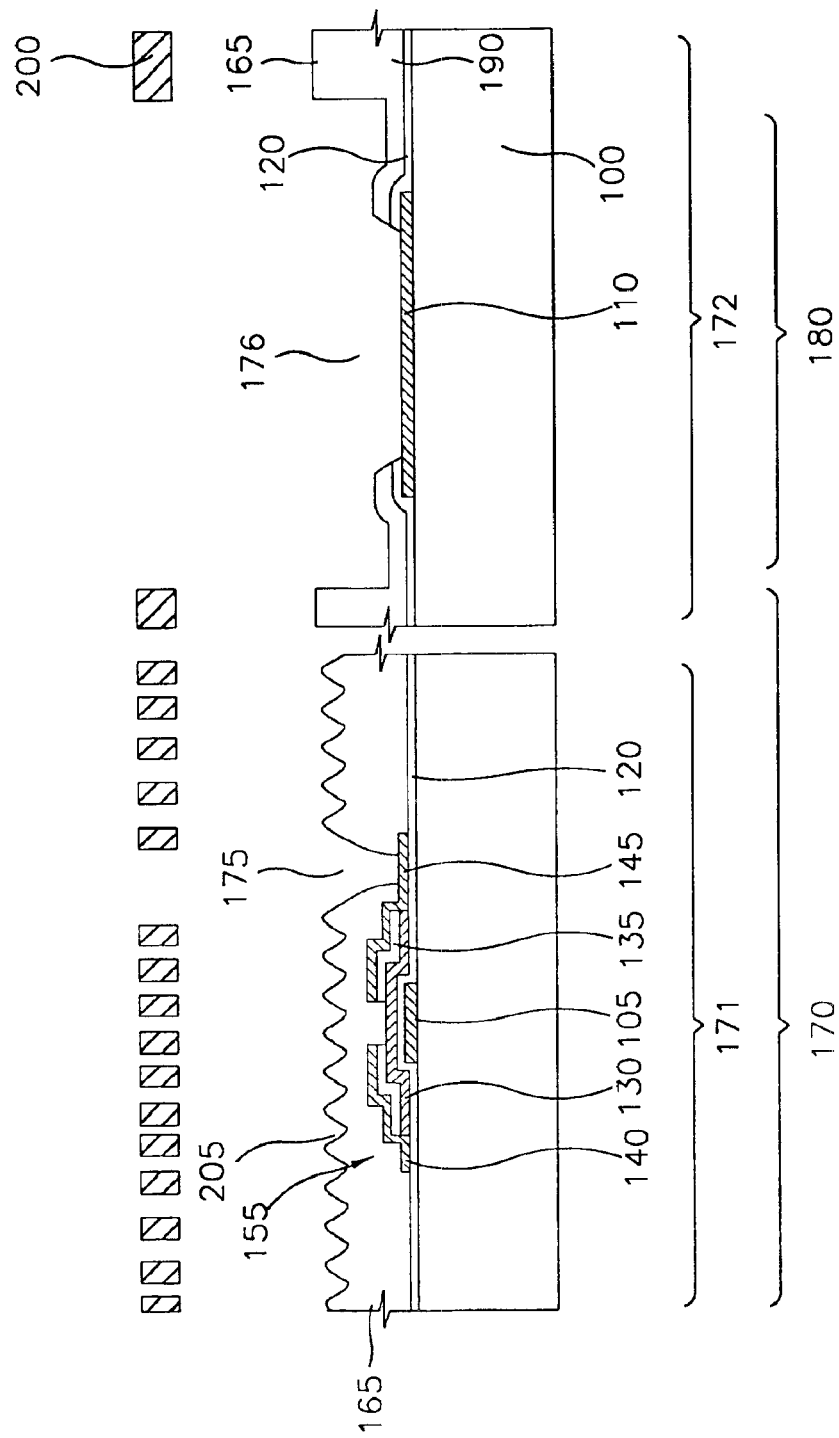

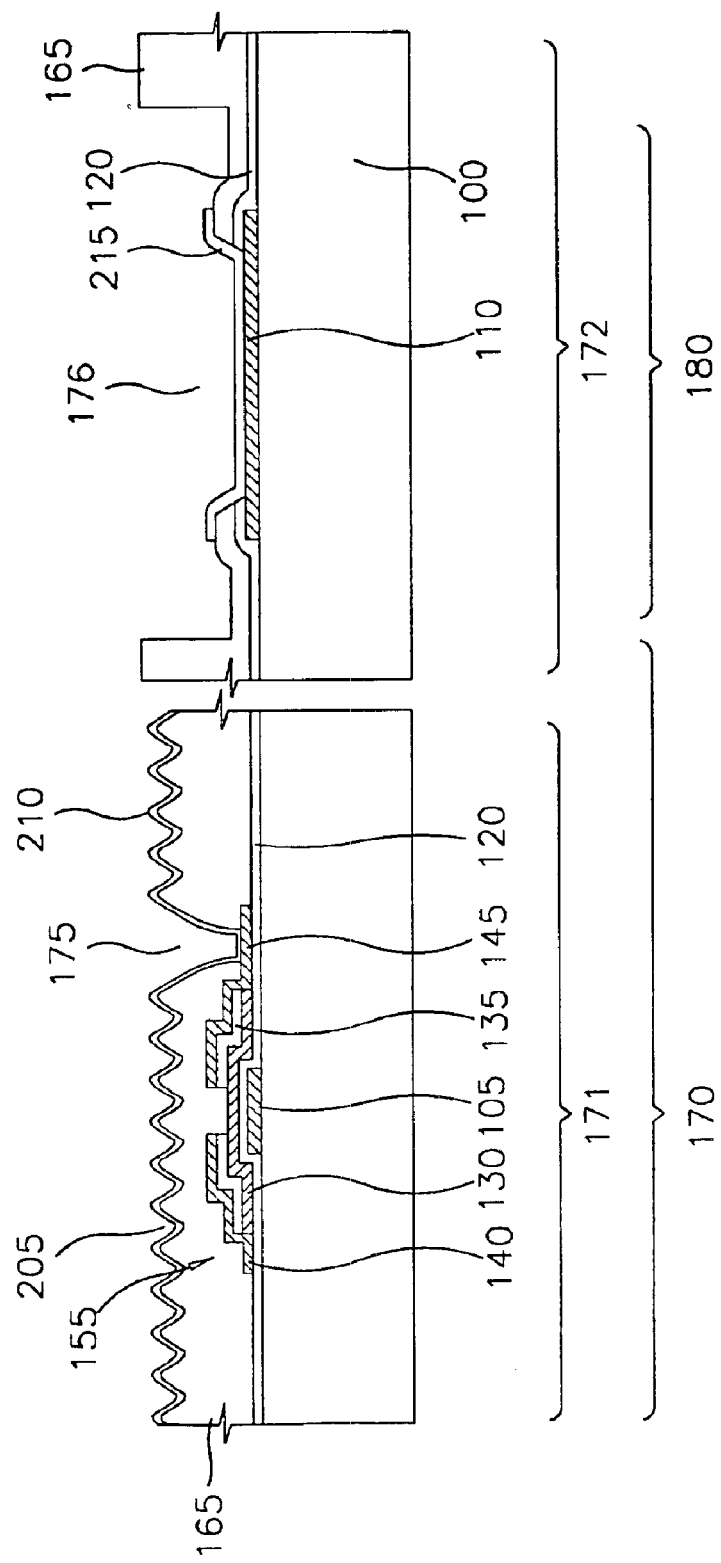

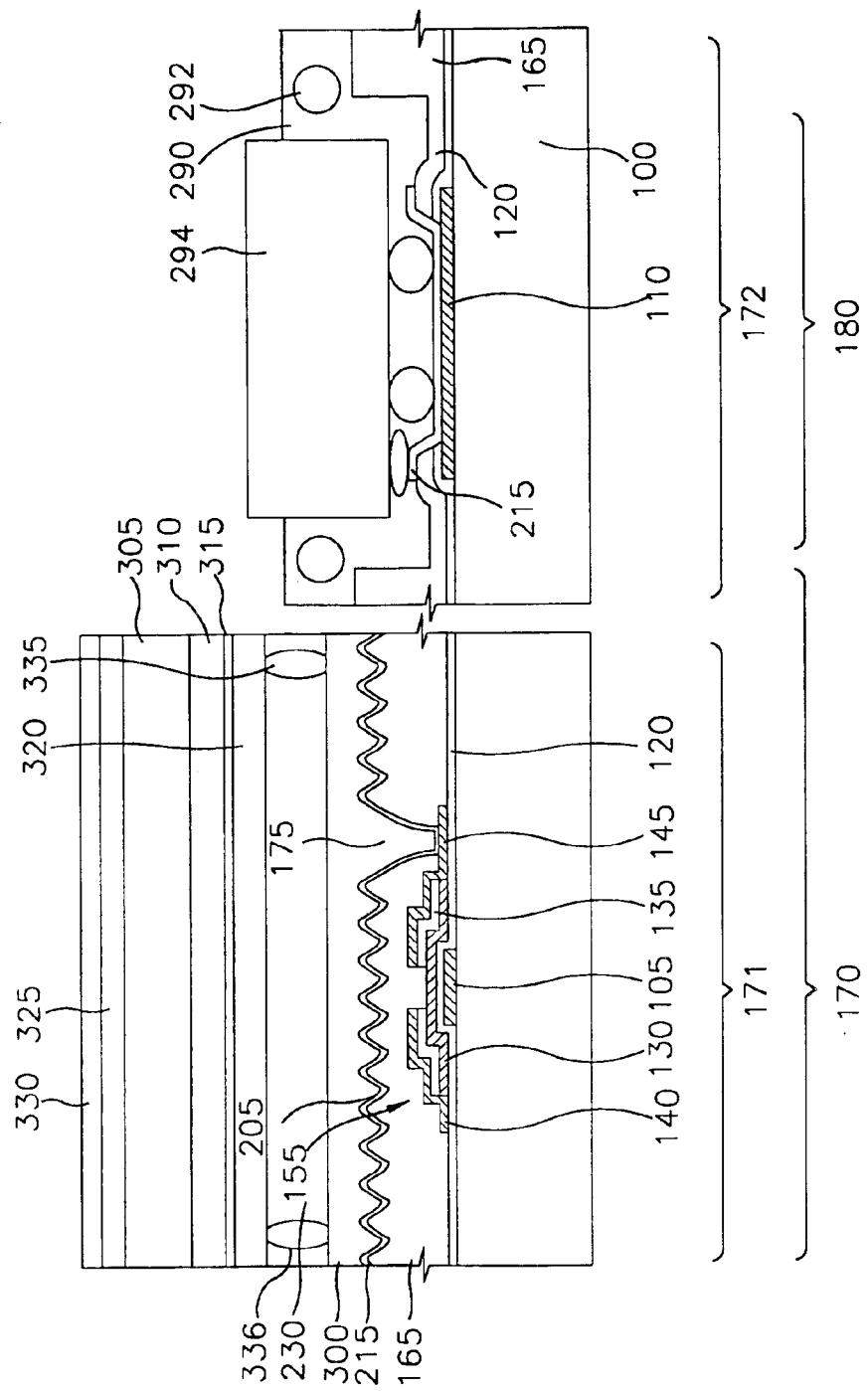

LIQUID CRYSTAL DISPLAY DEVICE AND METHOD FOR MANUFACTURING THE SAME

BACKGROUND OF THE INVENTION

1. Field of the Invention

The present invention relates to a method for a liquid crystal display device (LCD) and a method for manufacturing the same, more particularly to an LCD device having enhanced connection stability between a driving circuit of the LCD device and chip on glass (COG), a chip on film (COF) or a flexible printed circuit film (FPC) and a method for manufacturing the same.

2. Description of the Related Art

In the information society of the present time, electronic display devices are more important as information transmission media and various electronic display devices are widely applied for industrial apparatus or home appliances. Such electronic display devices are being continuously improved to have new appropriate functions for various demands of the information society.

In general, electronic display devices display and transmit various pieces of information to users who utilize such information. That is, the electronic display devices convert electric information signals outputted from an electronic apparatus into light information signals recognized by users through their eyes.

The electronic display devices are generally divided into emissive display devices and non-emissive display devices. The emissive display devices display light information signals through emitting lights and the non-emissive display device displays the light information signals through reflection, a scattering or an interference. The emissive display devices include a cathode ray tube (CRT), a plasma display panel (PDP), a light emitting diode (LED) and an electroluminescent display (ELD). The emissive display devices are called as active display devices. Also, the non-emissive display devices, called as passive display devices, includes a liquid crystal display (LCD), an electrochemical display (ECD) and an electrophoretic image display (EPID).

The CRT has been used for television sets or computer monitors as the display device for a long time since it has a high quality and a low manufacturing cost. The CRT, however, has some disadvantages such as a heavy weight, a large volume and high power dissipation. For these reasons, recently the demand for new electronic display devices has been greatly increased, such as a flat panel display device which has excellent characteristics, for example, a thin thickness, a light weight, a low driving voltage and a low power consumption. Such flat panel display devices can be manufactured using the rapidly improving semiconductor technology.

In the flat panel devices, liquid crystal display (LCD) devices have been widely utilized for various electronic devices because the LCD devices are thin, and has low power dissipation and high display qualities approximately identical to those of the CRT. Also, the LCD device can operate under a low driving voltage and can be easily manufactured.

The LCD devices are generally divided into a transmissive type and a reflection type. The transmissive type LCD device displays information by using an external light source and the reflection type LCD device displays information by using ambient light. The manufacturing processes for the trasmissive or the reflection type LCD device are already disclosed in various literatures.

FIGS. 1A, 1B and 1C depict the cross-sectional views of a conventional method for manufacturing a LCD device.

Referring to FIG. 1A, after a metal layer such as an aluminum (Al) layer or a chrome (Cr) layer is formed on a substrate 10 composed of an insulating material, the metal layer is patterned to form a gate electrode 15 and a gate pad 20. Then, a gate insulation layer 25 is formed on the whole surface of the substrate 10 where the gate insulation layer 25 formed by depositing silicon nitride and by a plasma chemical vapor deposition method.

Subsequently, amorphous silicon and an in-situ doped $n^+$ amorphous silicon are formed on the gate insulation layer 25 and are patterned and an amorphous silicon layer 30 and an ohmic contact layer 35 are formed on the gate electrode 15.

Then, a metal such as molybdenum (Mo), aluminum, chrome or tungsten (W) is deposited on the gate electrode 15 and patterned to form a source electrode 40 and a drain electrode 45. Hence, a thin film transistor (TFT) 60 having the gate electrode 15, the amorphous silicon layer 30, the ohmic contact layer 35, the source electrode 40 and the drain electrode 45 is formed in an active region 50 of the substrate 10 besides a pad region 70 of the substrate 10 corresponding to a peripheral portion of the active region 50.

Referring to FIG. 1B, an organic insulation layer 75 composed of an organic resist is formed on the active and the pad regions 50 and 70 of the substrate 10 so that a lower substrate of the LCD device is completed.

With reference to FIG. 1C, a mask (not shown) is positioned over the organic insulation layer 75 in order to from a contact hole 80 and a pad opening 81. Then, the contact hole 80 exposing the drain electrode 45 is formed in the organic insulating layer 75 after the organic insulation layer 75 is exposed and developed by using the mask. In this case, the pad opening 81 partially exposing the gate pad 20 is formed in the pad region 70 by simultaneously removing the gate insulation layer 25 under the organic insulation layer 75.

Subsequently, after a metal having an excellent reflectivity such as aluminum or nickel (Ni) is coated in the contact hole 80 and on the organic insulation layer 75, the metal is patterned to form a reflection electrode 85 having a predetermined shape of a pixel. At that time, a pad electrode 86 is formed in the pad opening 81 and on the organic insulation layer 75 positioned a peripheral portion of the pad opening 81 in the pad region 70.

Then, an orientation layer is formed on the resultant structure and an upper substrate (not shown) corresponding the lower substrate is prepared. The upper substrate includes a color filter, a transparent electrode and an orientation layer. Continuously, several spacers are interposed between the upper substrate and the lower substrate to combine the upper substrate with the lower substrate and a liquid crystal layer is formed between the upper substrate with the lower substrate, thereby accomplishing the LCD device.

In order to apply a driving signal to the LCD device from outside, a chip on glass (COG), chip on film (COF) or flexible printed circuit film (FPC) is connected to the LCD device as a connection device.

In the conventional method for manufacturing the LCD device, however, since the organic insulation layer or a layer having thick thickness is formed on the TFT as a protection layer, the connection failure between an external device and the LCD device may occur due to the step between the pad region having the metal formed thereunder and the peripheral region when the external device such as the COG, the COF or the FPC is connected to the pad region of the LCD device.

FIG. 2 is a cross-sectional view for showing the external device connected to the pad region of the LCD device in FIG. 1C. Referring to FIG. 2, the opening 81 is formed by exposing and developing the organic insulation layer 75 after the organic insulation layer 75 is coated on the pad region 70 including the pad 20, and then the pad electrode 86 is formed in the opening 81 and on a portion of the organic insulation layer 75 positioned near the opening 81.

Subsequently, in order to combine the pad electrode 86 with the COG or the COF, output ends of the COG or the COF or bumps 94 of input portion of the COG or the COF are aligned with the pad electrode 86 after an anisotropic conductive film 90 having conductive balls 92 is positioned on the pad electrode 86. Continuously, the pad electrode 86 and the bumps 94 are electrically connected to each other through the conductive balls 92 by a compression process.

The organic insulation layer 75 coated on the pad region 70 is formed thick enough to protect the TFT and to form the reflection electrode 85. This creates a high step of about 3 to 4 μm between one portion of the pad region 70 where the pad 20 is positioned and the other portion of the pad region 70. When the COG or the COF is connected to such pad region 70 by the compression process, the connection between the pad 20 and the COG or the COF may fail in the pad opening 81 due to the step in the pad region 70 as shown in FIG. 2. Thus, the LCD device module may not operate or operate improperly due to the connection failure.

In particular, the connection failure between the COG and the pad may be increased since the COG is connected to the pad by using the conductive ball with a diameter of about 5 μm during the conventional compression process.

Also, electrical shorts between adjacent pads become more likely may be increased when the organic insulation layer formed on the pads and the peripheral region is removed because the organic insulation layer prevents the electrical short between the adjacent pads among a plurality of pads, whereby reducing the reliability of the product. Therefore, the organic insulation layer positioned around the pad should be not removed.

SUMMARY OF THE INVENTION

It is therefore a first objective of the present invention to provide a liquid crystal display (LCD) device having improved connection stability by minimizing a step between a pad region and an adjacent region thereof when a chip on glass (COG), a chip on film (COF) or a flexible printed circuit (FPC) is connected to a driving circuit of the LCD device.

It is a second objective of the present invention to provide a method for manufacturing the LCD device having enhanced connection stability by minimizing the step between the pad region and the adjacent region thereof when the COG, the COF or the FPC is connected to the driving circuit of the LCD device.

To accomplish the first objective of the present invention, one preferred embodiment of the present invention provides a display device comprising a substrate having a first region and a second region and an insulation layer formed on the first and the second regions. The first region includes a pixel region where a pixel is formed to produce an image and a peripheral (outer) region surrounding the pixel region. The second region has a pad connected to the pixel for applying an electrical signal to the pixel from outside. The insulation layer has an opening formed in the second region to expose the pad. A second thickness of the insulation layer around the opening is less than a first thickness of the insulation layer in the peripheral region.

Also, to accomplish the first objective of the present invention, another preferred embodiment of the present invention provides a reflection type liquid crystal display device comprising a first substrate having a first region and a second region, a second substrate opposed to the first substrate, a liquid crystal layer, a reflection electrode formed at the central portion of the first substrate, and an organic insulation layer. The first region of the first substrate includes a pixel region at a central portion of the first substrate where a pixel is formed to produce an image and a peripheral region surrounding the pixel region and a pad connected to the pixel is formed in the second region for applying an electrical signal to the pixel from outside. The liquid crystal layer is formed between the first and the second substrates and the reflection electrode has a rugged structure composed relatively high and relatively low portions. The organic insulation layer is formed between the first substrate and the reflection electrode and also is formed in the first and the second regions. The organic insulation layer has a rugged structure identical to the rugged structure of the reflection electrode at a central portion of the first region and an opening in the second region to expose the pad. A second thickness of the organic insulation layer around the opening is less than a first thickness of the organic insulation layer in the peripheral region.

To accomplish the second objective of the present invention, one preferred embodiment of the present invention provides a method for manufacturing a display device comprising the steps of:

forming a pixel in a pixel region of a first region of a substrate, the first region including the pixel region and a peripheral region around the pixel region, and forming a pad in a second region of the substrate for applying an electric signal to the pixel;

forming an insulation layer having an opening in the second region to expose the pad and wherein the insulation layer being formed in the first region and the second region and a second thickness of the insulation layer around the opening is less than a first thickness of the insulation layer in the first region; and forming a pad electrode in the opening and on the insulation layer formed around the opening in the second region.

The pixel region is positioned at a central portion of the substrate and the second region is positioned in the peripheral region of the substrate. The pixel comprises a thin film transistor as a switching device and the pad comprises a gate input pad and a data input pad for applying an electric signal to the switching device. Preferably, the method further comprises forming a reflection electrode on the insulation layer in the pixel region and forming a pad electrode on the pad in the second region.

According to one embodiment of the present invention the step for forming the insulation layer is performed by forming a first insulation layer on the substrate, selectively removing the first insulation layer in the second region, forming a second insulation layer in the first region and in the second region, and forming the opening in the second insulation layer.

The step for removing the first insulation layer in the second region is performed by forming a contact hole in the first insulation layer for connecting the pixel, fully exposing the first insulation layer with an exposure amount for forming the contact hole after a first mask is positioned over the first insulation layer to remove the first insulation layer and developing the exposed first insulation layer.

The step for forming the opening in the second insulation layer is performed by forming a rugged structure on the second insulation layer after a second mask is positioned over the second insulation layer, exposing the second insulation layer with an exposure amount identical to an exposure amount for forming the rugged structure after the second mask for forming the opening is positioned over the second insulation layer, and developing the exposed second insulation layer.

According to another embodiment of the present invention the step for forming the insulation layer is performed by forming a first insulation layer on the substrate, patterning the first insulation layer to form an insulation layer pattern in the pixel region and to selectively remove the first insulation layer in the second region, forming a second insulation layer in the first and the second regions, and forming an opening in the second insulation layer in the second region.

The step for patterning the first insulation layer is performed by positioning a first mask on the first insulation layer for forming a rugged structure and a contact hole, fully exposing the first insulation layer with an exposure amount for forming the contact hole, and developing the exposed first insulation layer.

The step for forming the opening is performed by positioning a second mask over the second insulation layer for forming the contact hole and the opening, exposing the second insulation layer and developing the exposed second insulation layer.

According to still another embodiment of the present invention the step for forming the insulation layer is performed by forming an organic insulation layer on the substrate, primarily exposing the organic insulation layer with a full exposure amount for removing the organic insulation layer on the pad, partially exposing the organic insulation layer in the second region, and forming an opening in the second region and partially removing the organic insulation layer around the opening in the second region by developing the exposed organic insulation layer.

The step for primarily exposing the organic insulation layer is performed by exposing the organic insulation layer with a full exposure amount after a first mask is positioned over the organic insulation layer for forming the opening and a contact hole for electrically connecting the pixel.

The step for partially exposing the organic insulation layer is performed by exposing the organic insulation layer and the second region with a lens exposure amount for forming a reflection electrode on the organic insulation layer.

According to the present invention, it can be minimized that the difference in height between one portion of the organic insulation layer in the pad region and the other portion of the organic insulation layer adjacent to the pad region by exposing and developing single organic insulation layer or double organic insulation layers. Therefore, the connection failure between the pads of the LCD device and the COG, the COF, the FPC can be greatly decreased when the COG, the COF, the FPC is compressed to the pads of the LCD device. Also, the electrical short between the pads of the LCD device can be prevented since the organic insulation layer remains between the pads while the step between the pads is greatly decreased. Furthermore, the step in the pad region can be minimized without performing another process for reducing the step since it is reduced that the height difference between the height difference between one portion of the organic insulation layer in the pad region and the other portion of the organic insulation layer adjacent to the pad region when the organic insulation layer is exposed and developed so as to from the contact hole and the reflection electrode.

BRIEF DESCRIPTION OF THE DRAWINGS

The above objective and advantages of the present invention will become more apparent by describing in detail preferred embodiments thereof with reference to the attached drawings, in which:

FIGS. 1A, 1B and 1C are cross-sectional views showing manufacturing steps of the conventional liquid crystal display device;

FIGS. 4A, 4B, 4C, 4D, 4E, 4F and 4G are cross-sectional views taken along the line of A–A' in FIG. 3 so as to illustrate manufacturing steps of the liquid crystal display device according to the first embodiment of the present invention;

FIGS. 5A, 5B, 5C and 5D are cross-sectional views for illustrating a method for manufacturing a liquid crystal display device according to a second embodiment of the present invention; and FIGS. 6A, 6B, 6C and 6D are cross-sectional views for illustrating steps for forming an organic insulation layer according to a third embodiment of the present invention.

DETAILED DESCRIPTION OF THE PREFERRED EMBODIMENTS

Hereinafter, the present invention will now be described more fully with reference to the accompanying drawings, in which preferred embodiments of the present invention are shown. The present invention may, however, be embodied in many different forms and should not be construed as being limited to the embodiments set forth herein. Rather, these embodiments are provided so that this disclosure will be thorough and complete, and will fully convey the concepts of the present invention to those skilled in the art. Throughout the accompanying drawings, the thicknesses and the dimensions of the various layers and regions are exaggerated for clarity.

Embodiment 1

Figure 3:
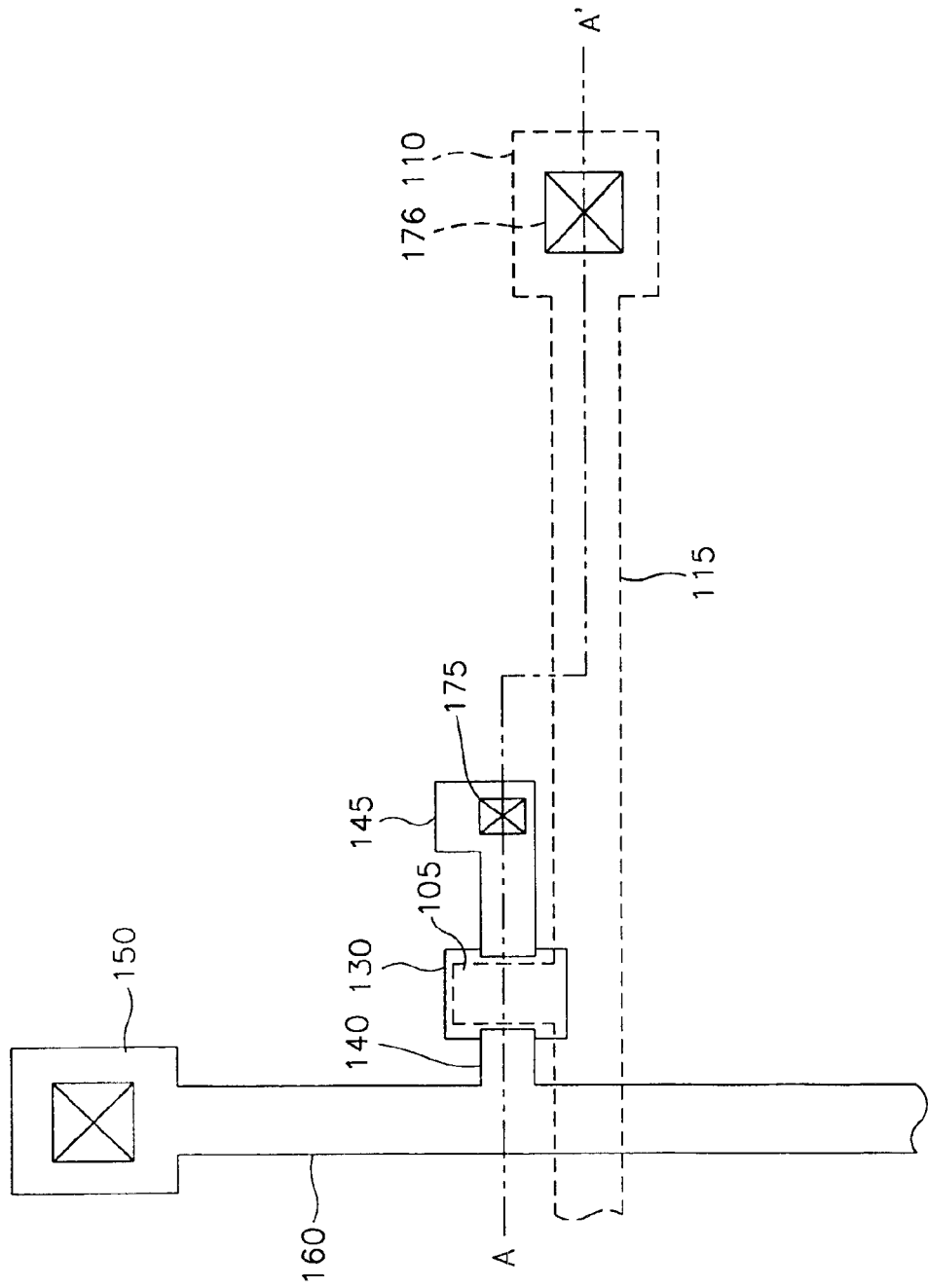
FIG. 3 is a plane view illustrating a method for manufacturing a liquid crystal display device according to a first embodiment of the present invention.
Figure 4B:
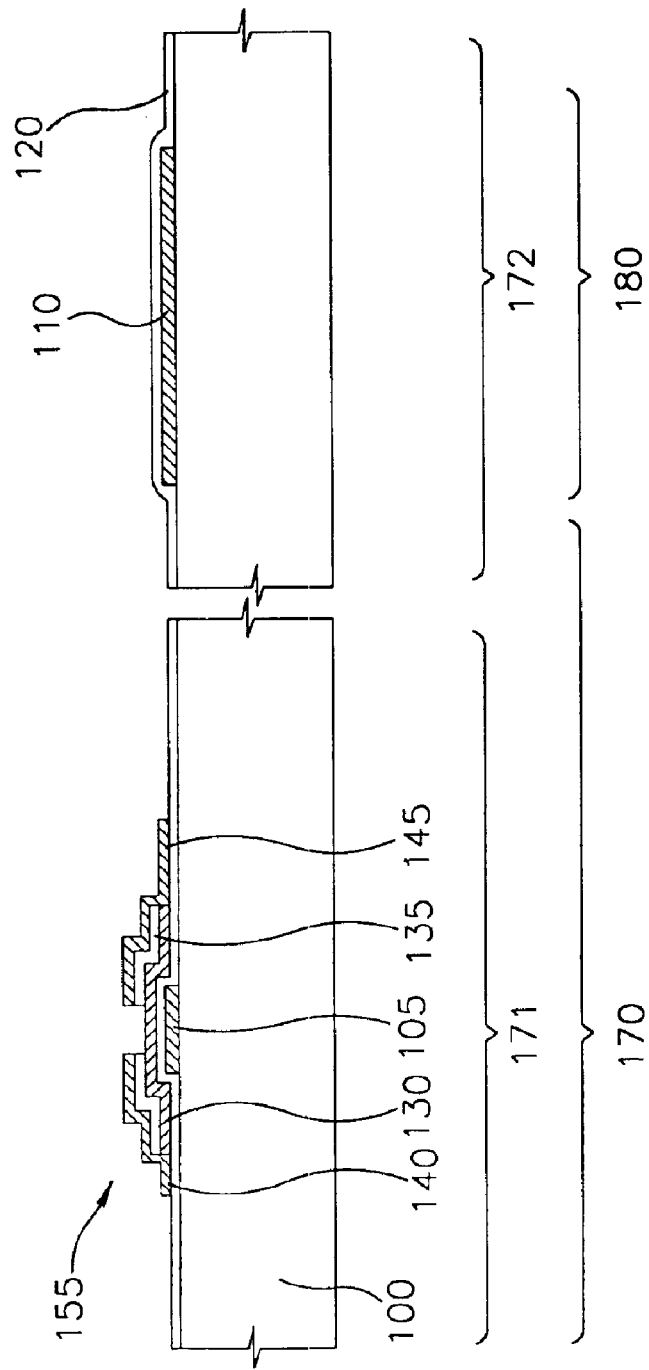
Figure 4C:
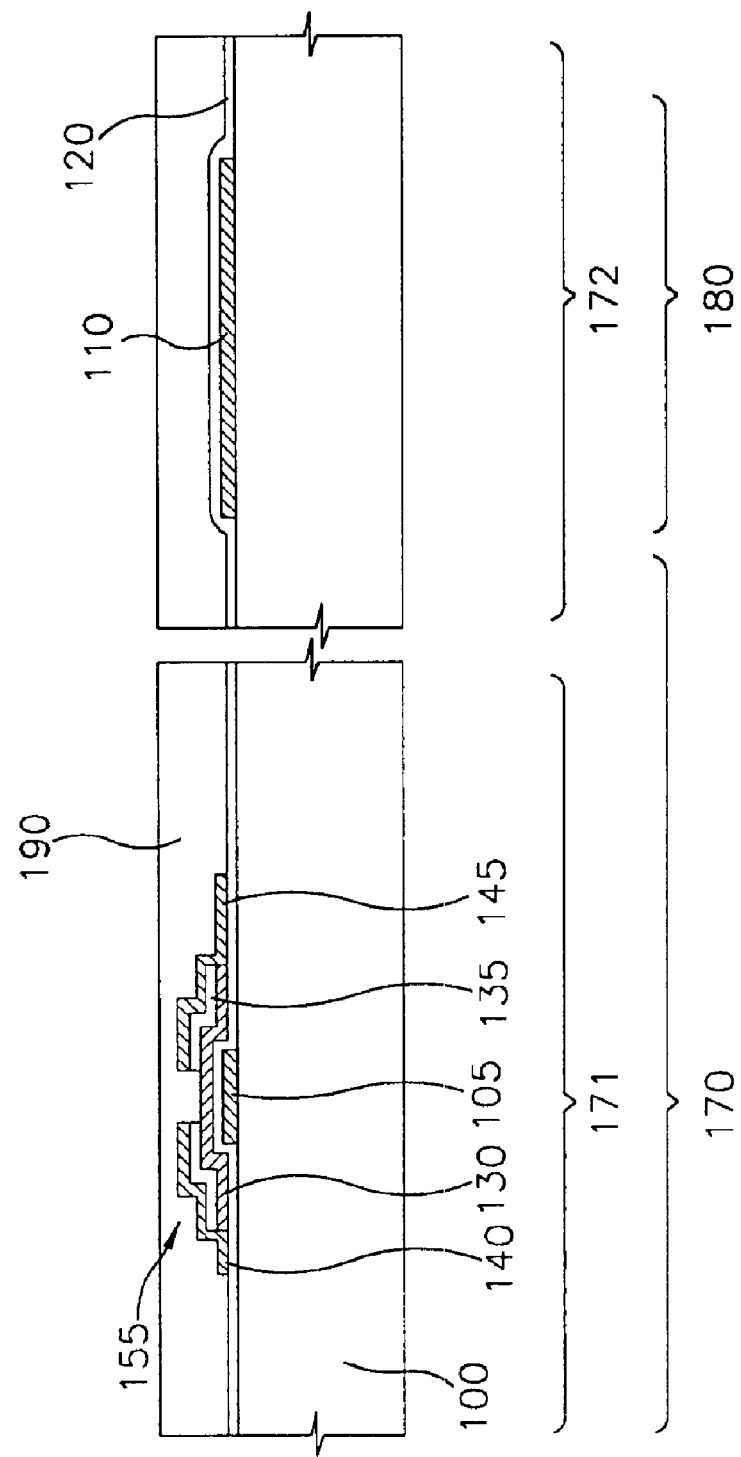

FIG. 3 is a plane view illustrating a method for manufacturing an LCD device according to a first embodiment of the present invention and FIGS. 4A, 4B and 4C are cross-sectional views taken along line A–A' in FIG. 3 for showing manufacturing steps of the LCD device according to the first embodiment of the present invention.

In a reflection type LCD device or a semi-transmissive type LCD device, in order to form a prominence and depression portions on a reflection electrode, the reflection electrode is coated on an organic insulation layer having a rugged surface to have a rugged shape after the organic insulation layer is exposed and developed to have the prominence and the depression portions on the surface of the organic insulation layer. A full exposure process for double organic insulation layers, a partial exposure process for a single organic insulation layer or a silt exposure process for a single organic insulation layer can be presented as the process for forming the rugged surface on the organic insulation layer.

In the present embodiment, a method for minimizing the step in the pad region by using the double organic insulation layers through the full exposure process will be described.

Referring to FIGS. 3 and 4A, a thin film transistor as a switching device is formed on a first substrate 100 composed of a non-conductive material such as glass or ceramic. At first, a metal such as molybdenum (Mo), chrome (Cr), tantalum (Ta), titanium (Ti), copper (Cu) or tungsten (W) is deposited on the first substrate 100 to from a metal layer. The first substrate 100 is divided into a first region 170 and a second region 180. The first region 170 includes a pixel region 171 where a pixel is formed to produce an image and a portion of a peripheral region 172 around the pixel region 171. A pad is not formed in the first region 170 of the first substrate 100. The second region 180 is a pad region where a pad connected to the pixel is formed so as to apply an electric signal to the pixel. That is, the pixel region 171 is positioned at a central portion of the first substrate 100 and the peripheral region 172 is positioned at peripheral portion of the first substrate 100. In FIG. 4A, the second region 180 is formed in the peripheral region 172. Namely, the second region 180 is formed a portion of the peripheral region 172.

The metal layer is patterned by the photolithography method so that a gate line 115 and a gate electrode 105 branched from the gate line 115 are formed in the pixel region 171 of the first region 170 where the pixel is formed to produce the image. At the same time, in order to apply the electrical signal to the pixel, a gate input pad 110 elongated from the gate line is formed in the second region 180 corresponding to a portion of the peripheral region 172 around the pixel region 171 of the first region 170 of the first substrate 100. In this case, the gate input pad 110 has an area wider than that of the gate electrode 105 and also the area of the gate pad 110 is wider than that of the gate line 115. The gate electrode 105, the gate input pad 110 and the gate line 115 may be formed by using an alloy including aluminum-copper (Al—Cu) or aluminum-silicon-copper (Al—Si—Cu).

Referring to FIG. 4B, a silicon nitride ($Si_xN_y$) layer is deposited to form a gate insulation layer 120 on the first substrate 100 on which the gate electrode 105, the gate input pad 110 and the gate line 115 are formed. The silicon nitride layer is formed by the plasma chemical vapor deposition method.

Then, after an amorphous silicon layer and an in-situ doped $n^+$ amorphous silicon layer are formed on the gate insulation layer 120 by the plasma chemical vapor deposition method, the amorphous silicon and the $n^+$ amorphous silicon layers are patterned to form a semiconductor layer 130 and an ohmic contact layer 135 on the gate insulation layer 120 under which the gate electrode 105 is positioned. In this case, the semiconductor layer 130 may be transformed into a polysilicon layer by irradiating a laser having a predetermined intensity onto the amorphous silicon layer.

Subsequently, after a metal layer composed of aluminum, molybdenum, tantalum, titanium, chrome, tungsten or copper is formed over the first substrate 100 having the resultant structure thereon, the metal layer is patterned to form a data line 160 perpendicular to the gate line 120, to form a source electrode 140 branched from the data line 160 and to form a data input pad 150 connected to the data line 160. Thus, a TFT 155 including the gate electrode 105, the semiconductor layer 130, the ohmic contact layer 135, the source electrode 140 and the drain electrode 145 is formed in the first region 170 positioned at the central portion of the first substrate 100. Also, the gate input pad 110 and the data input pad 150 are formed in the second region 180 positioned at the peripheral portion of the first substrate 100. The second region 180 corresponds to a pad region. At that time, the gate insulation layer 120 is interposed between the data line 160 and the gate line 120 to prevent an electrical short therebetween.

Referring to FIG. 4C, a photosensitive organic resist having a thickness of about 2 to 3 $\mu$m is coated over the entire surfaces of the first and the second regions 170 and 180 of the first substrate 100 by a spin coating method, so a first organic insulation layer 190 is formed.

Referring to FIG. 4D, a first mask 185 is positioned over the first organic insulation layer 190 to expose a contact hole 175, the gate input pad 110, the data input pad 150 and their peripheral portions. A full exposing process is performed on the first organic insulation layer 190 and then the contact hole 175 exposing the drain electrode 145 of the TFT 155 is formed in the first organic insulation layer 190 through a developing process. In this case, portions of the first organic insulation layer 190 formed on and around the gate and data input pads 110, 150 in the second region 180 are removed during the full exposing and the developing processes. That is, a portion of the first organic insulation layer 190 formed on and around the peripheral portion of the first substrate 100 under which the gate input pad 110 is positioned besides the pixel region 171 is removed during the full exposing and the developing processes. Also, a portion of the first organic insulation layer 190 formed on and around the data input pad 150 (namely, the portion of the first organic insulation layer 190 positioned in the second region 180) is removed. At that time, the gate insulation layer 120 formed in the second region 180 is removed by a dry etching process and by using the first organic insulation layer 190 as a mask to expose the gate input pad 110.

Figure 4E:
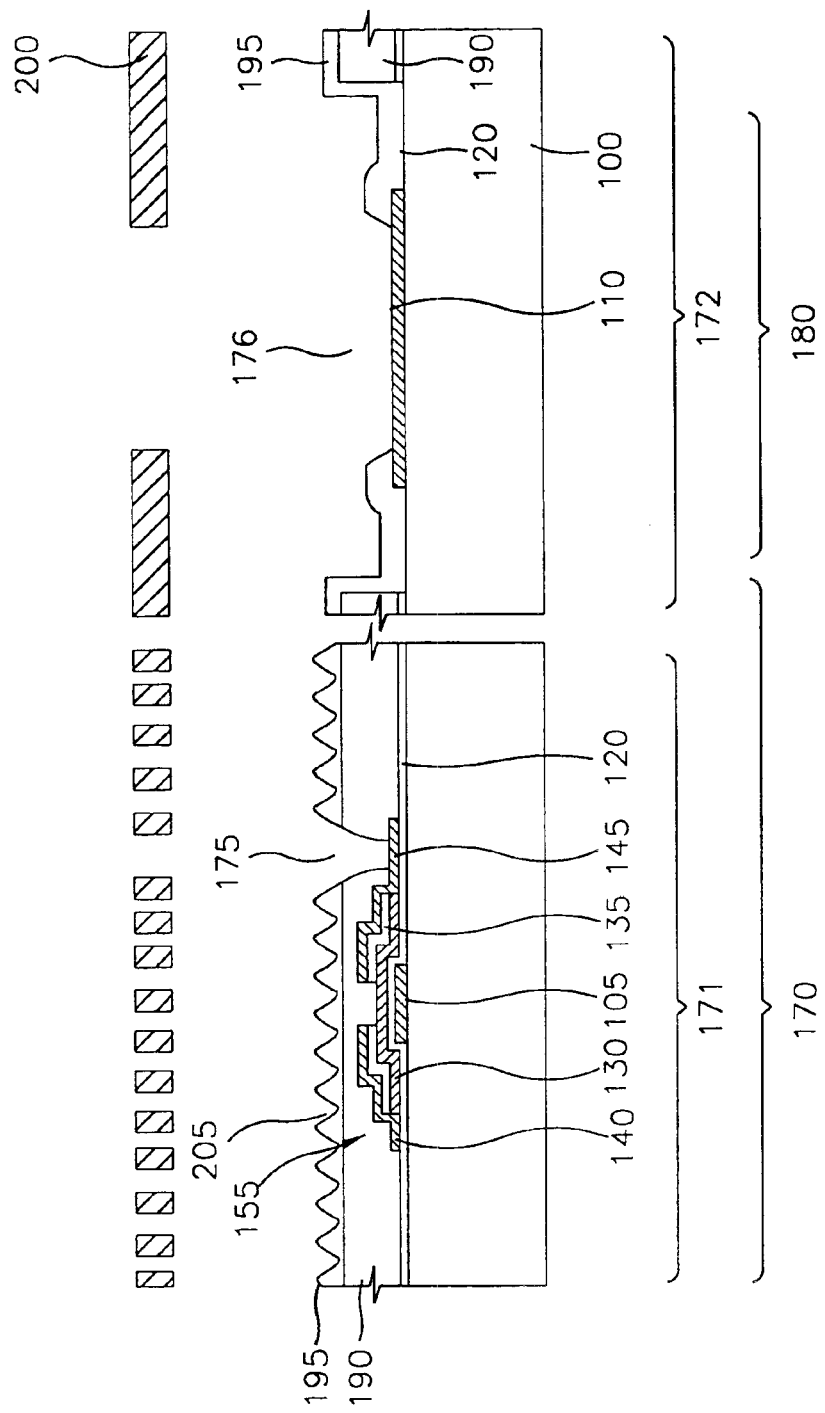

Referring to FIG. 4E, in order to form an insulation layer for insulating the gate and the data input pads 110, 150 to prevent an electrical short between the gate input pad 110 and the data input pad 150, a second organic insulation layer 195 is formed on the first region 170 and the second regions 180 of the first substrate 100. That is, the second organic insulation layer 195 is formed on the active region 170 and the pad region 180 after an organic resist identical to the first organic insulation layer 190 is coated on the active and the pad regions 170, 180 respectively corresponding to the first and the second regions 170, 180. The organic resist is coated by the spin coating method and the second organic insulation layer 195 has a thickness of about 0.5 to about 1.5 $\mu$m, preferably about 1.0 $\mu$m. Therefore, the second organic insulation layer covers the second region 180 including the gate input pad 110, the data input pad 150 and the peripheral portions of the pads 110, 150.

Then, a second mask 200 is positioned over the second organic insulation layer 195 to form a rugged structure 205 on the second organic insulation layer 195 and to form an opening 176 exposing the data input pad 150. Continuously, the pixel region 171 is exposed with a lens exposure amount so as to form the rugged structure 205 composed of a plurality of micro lenses on the second organic insulation layer 195 positioned on the pixel region 171 of the first region 170 of the first substrate 100. Also, a portion of the second organic insulation layer 195 in the second region 180 is exposed to form the opening 176. After the developing process is executed, the rugged structure 205 is formed on the second insulation layer 195 and the gate input pad 110 is exposed through the opening 176. At that time, the data input pad 150 is also exposed.

The rugged structure 205 consists of relatively high portions and relatively low portions. That is, the rugged structure 205 has a plurality of protrusions having relatively high heights and a plurality of grooves having relatively low heights. In this case, the depth of the groove (or the height of the protrusion) is about 0.5 to about 1.0 µm.

As it is described above, the step between the portion where the gate and the data input pads 110, 150 are positioned and the portion adjacent the pads 110, 150 can be greatly reduced since the second organic insulation layer 195 formed on the second region 180 is considerably thin and the gate and the data input pads 110, 150 are exposed through the exposing and the developing processes after the first organic insulation layer 190 formed on the second region 180 corresponding to the pad region is removed.

Figure 4F:
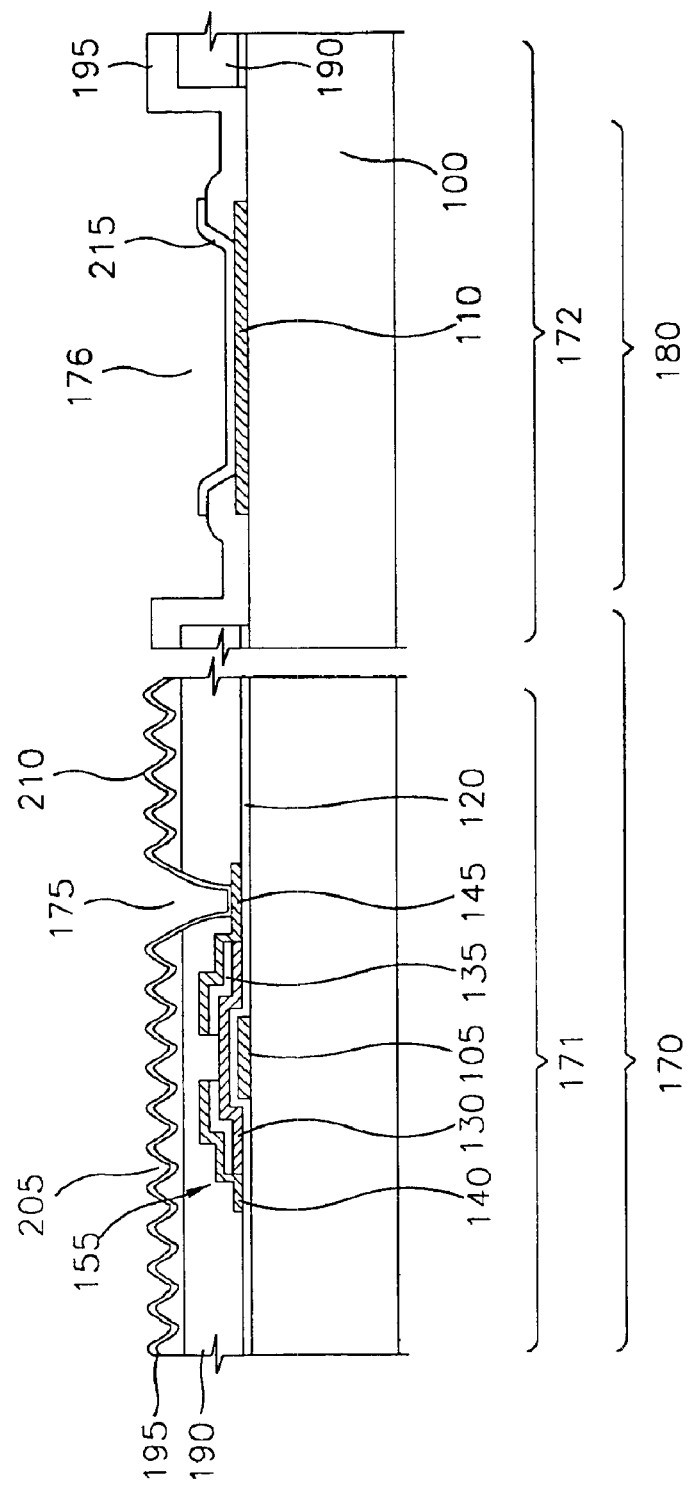

With reference to FIG. 4F, after a metal having excellent reflectivity such as aluminum, nickel, chrome or silver (Ag) is coated on the pad region 180, on the surfaces of the first organic insulation layer 190 and the second organic insulation layer 195 having the rugged structure 205 and in the contact hole 175 exposing the drain electrode 145, the metal is patterned to form a reflection electrode 210 having a shape of the pixel in the pixel region 171 of the first substrate 100. Hence, the reflection electrode 210 has a rugged surface according to the rugged structure 205 of the first and the second organic insulation layers 190, 195. In this case, a pad electrode 215 is formed on the gate input pad 110 and the data input pad 150. The pad electrode 215 has a dull shape and has a height smaller than the depth of the contact hole 175. The successive manufacturing processes for the LCD device of the present invention are the same as those of the conventional method for manufacturing the LCD device.

Figure 4G:
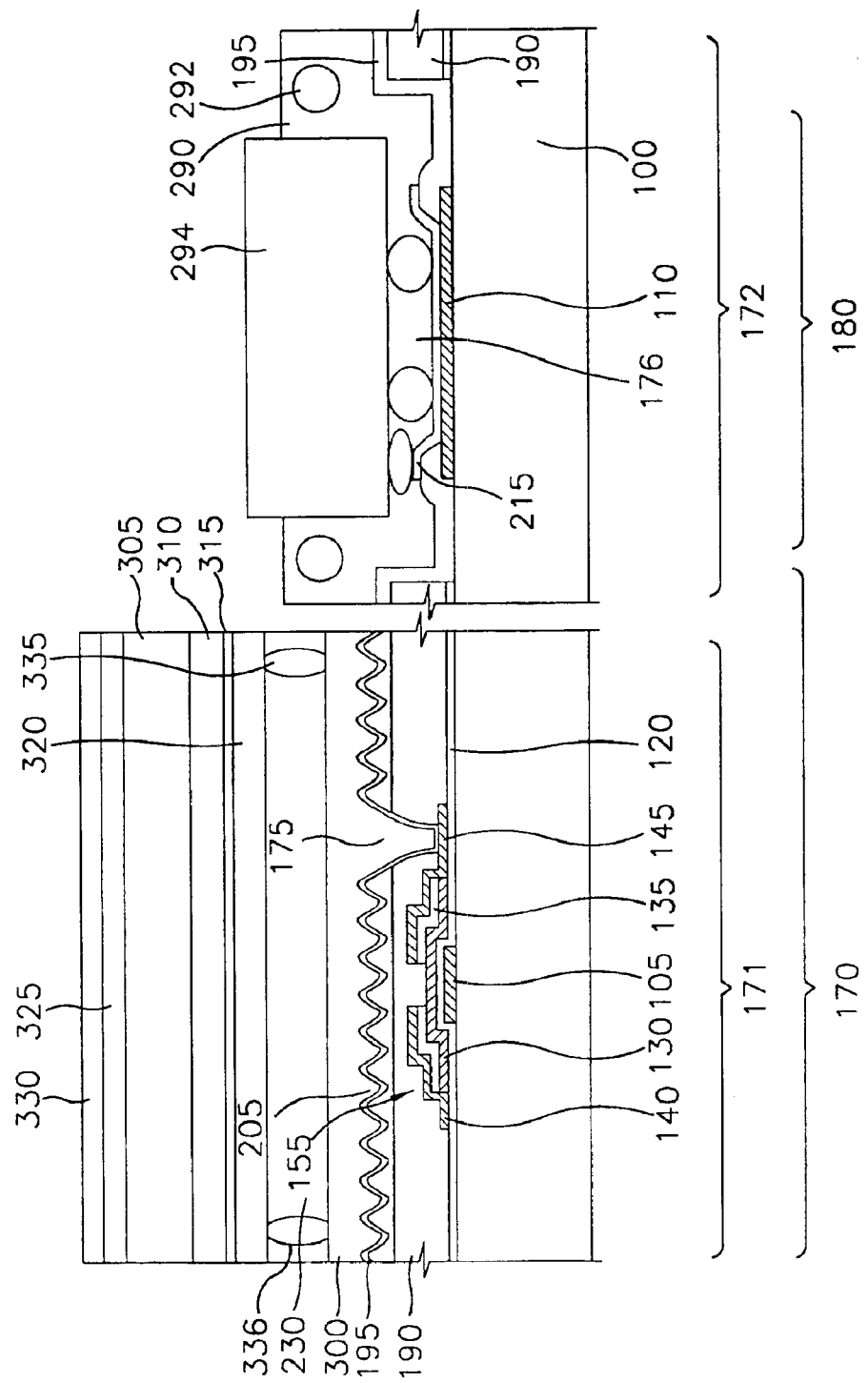

FIG. 4G is a cross-sectional view showing the completed LCD device according to the present embodiment. Referring to FIG. 4G, after a first orientation layer 300 is formed on the resultant structure, a second substrate 305 opposed to the first substrate 100 is disposed on the first substrate 100. The second substrate 305 includes a color filter 310, a common electrode 315, a second orientation layer 320, a phase plate 325 and a polarization plate 330. The second substrate 305 is made of a material identical to the first substrate 100 such as glass or ceramic. The phase plate 325 and the polarization plate 330 are formed on the second substrate 305 in such an order. The color filter 310 is positioned beneath the second substrate 305 and the common electrode 315 and the second orientation layer 320 are formed beneath the color filter 310 in that order.

A liquid crystal layer 230 is inserted in a space provided by interposing a plurality of spacers between the first substrate 100 and the second substrate 305, thereby accomplishing a reflection type LCD device or a semi-transmissive type LCD device.

Then, after an anisotropic conductive film 290 having conductive balls 292 is coated on the input pads 110, 150 formed in the pad region 180 of the first substrate 100, a bump 294 of a COG, a COF or an FPC is compressed and then the input pads 110, 150 are connected the COG, the COF or the FPC, thereby completing a reflection type LCD module or a semi-transmissive type LCD module.

As shown in FIG. 4G, the LCD device includes an insulation layer composed of the first and the second organic insulation layers 190, 195. The first organic insulation layer 190 is formed in the first region 170 where the pixel is formed and the first organic insulation layer 190 has a thickness of about 2.5 to about 4.5 µm. Also, the LCD device has a second organic insulation layer 195. The second organic insulation layer 195 is formed in the pad region 180 and has a thickness of about 0.5 to about 1.5 µm. The rugged structure 205 is formed on the surface of the first insulation layer 190 positioned on the pixel region 171 of the first region 170 where the pads 110, 150 are not formed. The second organic insulation layer 195 has the opening 176 exposing the pads 110, 150.

According to the present embodiment, the step between the pads and the portion of the organic insulation layer adjacent the pads is lower than the step between the contact hole and the portion of the organic insulation layer adjacent the contact hole through exposing and developing the double organic insulation layers composed of the first and the second insulation layers. This may significantly reduce the connection failure between the pads and the COG, the COF or the FPC when the COG, the COF or the FPC is compressed for connecting the COG, the COF or the FPC to the pads of the LCD device.

Embodiment 2

In the first embodiment of the present invention, the second organic insulation layer is formed in the second region after the first organic insulation layer is removed through the full exposing process. However, the second organic insulation layer may be formed after an insulation layer pattern for forming the rugged structure on the first region corresponding to the active region. Thus, the insulation layer pattern for forming the rugged structure is previously formed on the organic insulation layer in the first region according a second embodiment of the present invention.

FIGS. 5A, 5B, 5C and 5D are schematic cross-sectional views illustrating a method for manufacturing an LCD device according the second embodiment of the present invention.

Referring to FIG. 5A, a first organic insulation layer 190 is formed on a first region 170 of a first substrate 100 where a TFT 155 is formed according the processes shown in FIGS. 4A, 4B and 4C. Then, a first insulation layer pattern 190a for forming a rugged structure and a contact hole 175 are formed on and in the first organic insulation layer 190 in the first region 170. After a first mask 185 is positioned over the first organic insulation layer 190 in the first region 170 so as to expose pad region 180 including a gate input pad 110, a data input pad 150 and a peripheral portion adjacent to the pads 110, 150, a full exposing process is proceeded with a predetermined exposure amount (that is, the sufficient exposure amount to form the contact hole 175). Subsequently, a developing process is performed to form the contact hole 175 exposing a drain electrode 145 of the TFT 155 in the first organic insulation layer 190. In this case, the first insulation pattern 190a is formed in a pixel region 171 for forming the rugged structure on a surface of a reflection electrode and a portion of the first organic insulation layer 190 positioned on the gate and the data input pads 110, 150 and on the peripheral portion adjacent to the pads 110, 150 in a second region 180 is removed. Namely, the portion of the first organic insulation layer 190 formed around the gate input pad 110 in a peripheral region 172 except the pixel region 171 is removed. Also, the portion of the first organic insulation layer 190 formed around the data input pad 150 is simultaneously removed. Thus, the first organic insulation layer 190 remains in the peripheral region 172 besides the portion of the second region 180 where the pads 110, 150 are positioned.

Figure 5B:
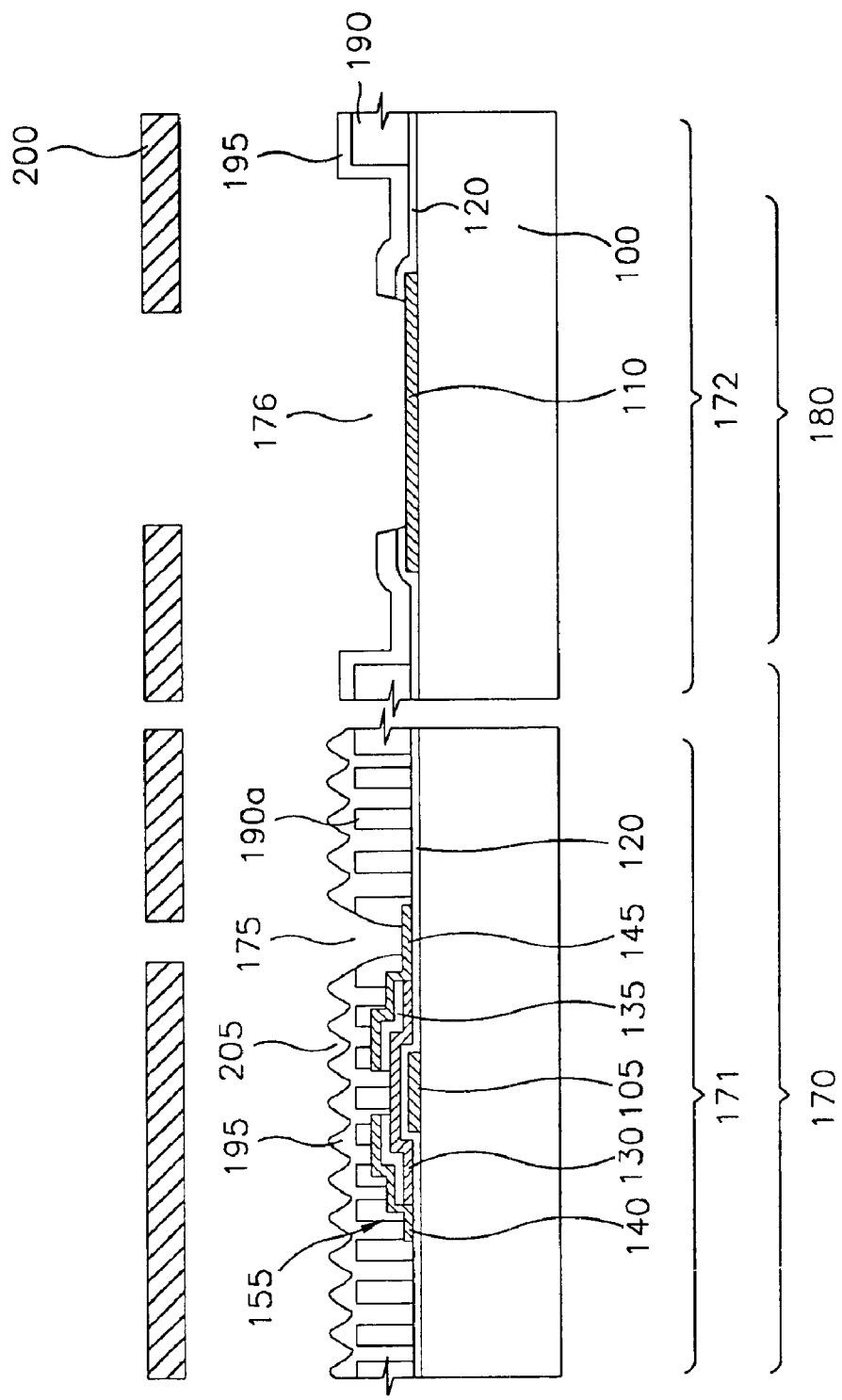

Referring to FIG. 5B, a second organic insulation layer 195 is coated on the first region 170 and the second region 180 of the first substrate 100. The second organic insulation layer 195 is formed by a spin coating method and has a thickness of about 0.3 to about 3 μm, preferably about 0.5 to 1.5 μm, more preferably about 1 μm. The second organic insulation layer 195 is composed of an organic resist identical to the first organic insulation layer 190. The second organic insulation layer 195 is positioned on the first insulation layer pattern 190a and on the first substrate 100 including the first organic insulation layer 190 formed thereon. Hence, the rugged structure 205 is formed in the pixel region 171 according to the first insulation layer pattern 190a and the second organic insulation layer 195 is coated on the second region 180.

Subsequently, in order to form an opening 176 exposing the data input pad 150 in the second region 180 and a contact hole 175 in the pixel region 171, a second mask 200 is positioned over the first substrate 100. Then, the contact hole 175 is formed in the first organic insulation layer 190 with a predetermined exposure amount for forming the opening 176 and the opening 176 is formed in the second region 180 to expose the gate and the data input pads 110, 150 after an exposing and a developing processes are performed.

The step between the pads 110, 150 and the portion of the second organic insulation layer 195 adjacent to the pads 110, 150 can be greatly decreased since the gate and the data input pads 110, 150 are exposed through the exposing and the developing processes after the portion of the first organic insulation layer 190 positioned in the second region 180 is removed and the second organic insulation layer 195 having a low height is formed in the second region 180.

Referring to FIG. 5C, the reflection electrode 210 is formed by the method identical to the method illustrated in FIG. 4F. Thus, the rugged structure 205 is formed on the surface of the reflective electrode 210 in the pixel region 179 according to shapes of the first and the second organic insulation layers 190, 195. At that time, a pad electrode 215 is formed on the data and the gate input pads 110, 150 and the pad electrode 215 is lower than that of the contact hole 175.

Figure 5D:
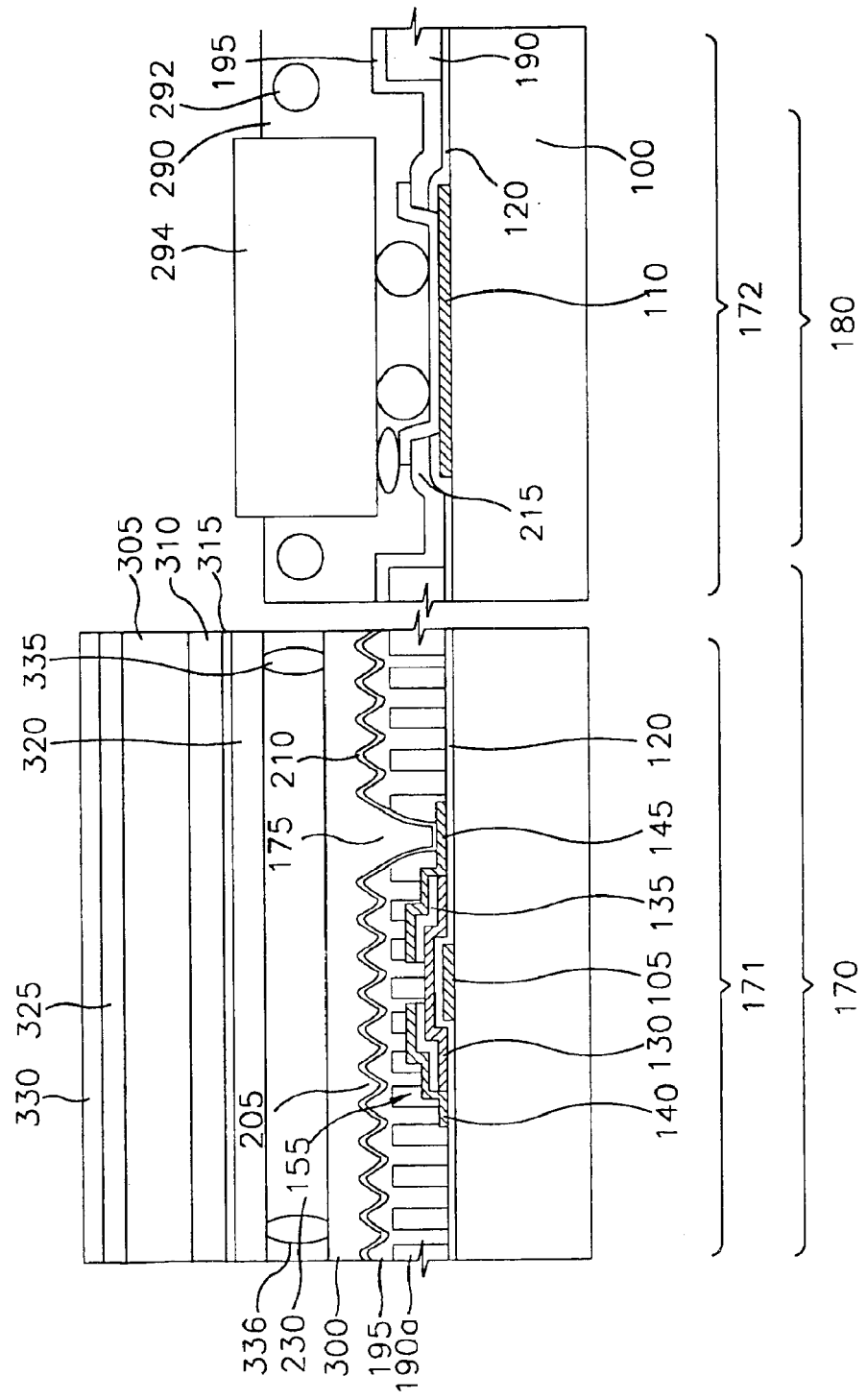

FIG. 5D is a cross-sectional view for showing a completed LCD device according to the present embodiment.

In the same manner as illustrated in FIG. 4G, after a first orientation layer 300 is formed on the resultant structure on the first substrate 100, a second substrate 305 is disposed on the first substrate 100. The second substrate 305 includes a color filter 310, a common electrode 315, a second orientation layer 320, a phase plate 325 and a polarization plate 330.

After a plurality of spacers 335, 336 are interposed between the first substrate 100 and the second substrate 305, a liquid crystal layer 230 in inserted in a space formed between the first and the second substrates 100, 305 by the spacers 335, 336, so a reflection type or a semi-transmissive type LCD device is completed.

After an anisotropic conductive film 290 is positioned on the input pads 110, 150 formed in the pad region 180 of the first substrate 100, a bump 294 of a COG, a COF or an FPC is compressed so as to be connected to the pads 110, 150, thereby accomplishing a reflection type LCD module or a semi-transparence type LCD module.

As shown in FIG. 5D, in the completed LCD device according to the present embodiment, a first insulation layer having a thickness of about 2.5 to about 4.5 μm is formed in the pixel region 171 and a second insulation layer having a thickness of about 0.5 to about 1.5 μm is formed in the second region 180.

The first insulation layer includes the first insulation layer pattern 190a and the second organic insulation layer 195. That is, the first insulation layer formed in the first region 170 includes the first insulation layer pattern 190a in the pixel region 171 for forming the reflection electrode pattern and also the second insulation layer includes the first organic insulation layer 190 formed in the peripheral region 172 and the second organic insulation layer 195 having the opening 176 exposing the pads 110, 150 in the second region 180. The second organic insulation layer 195 has the rugged structure thereon in accordance with the first insulation layer pattern 190a and extends to the second region 180.

Figure 1B:
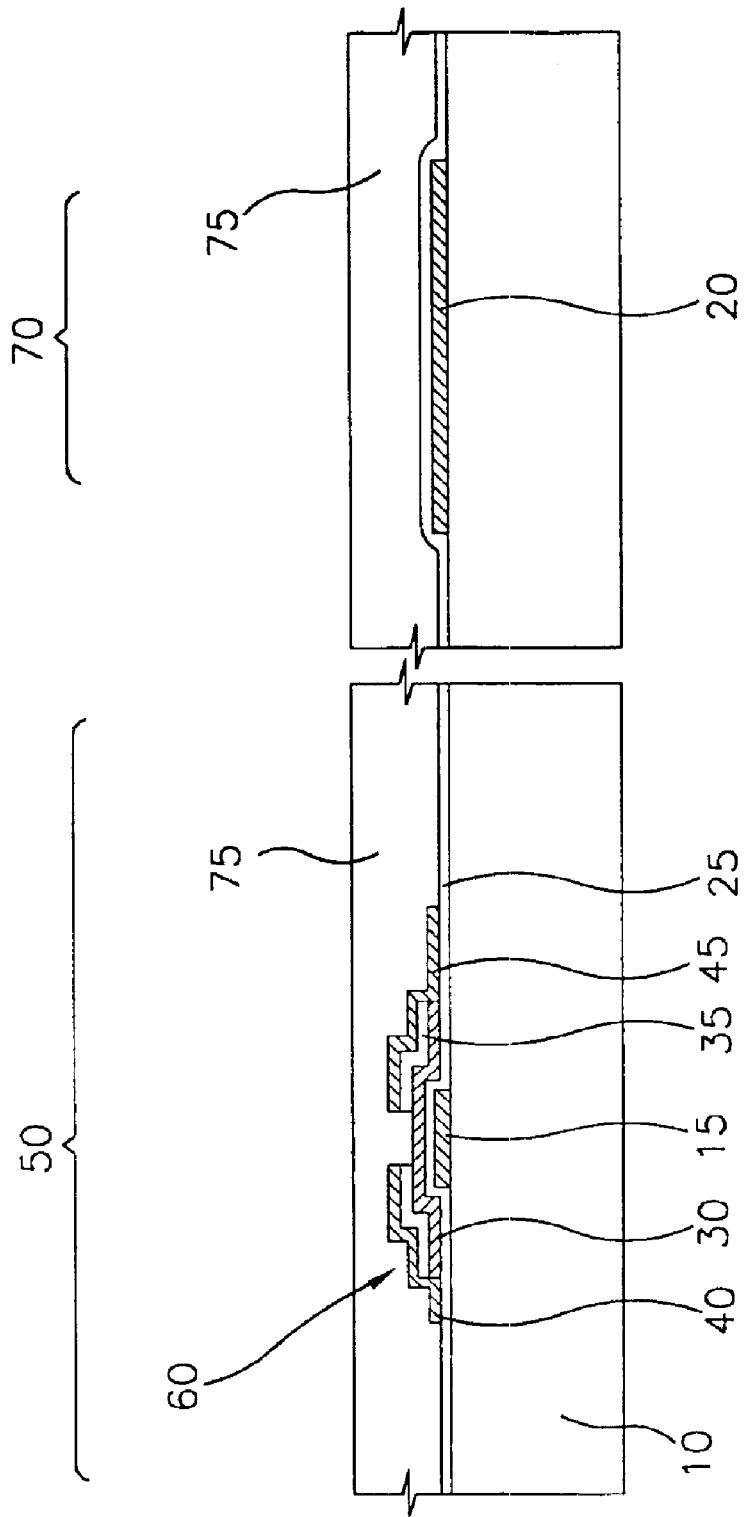
Figure 2:
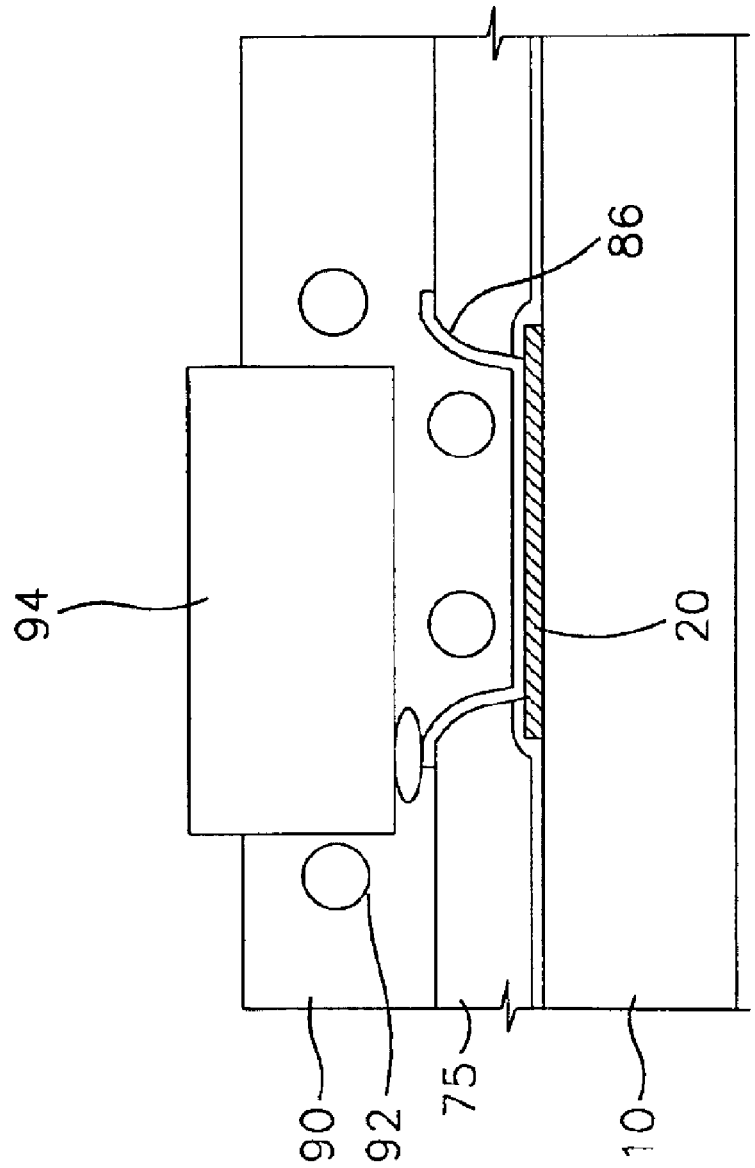
FIG. 2 is a cross-sectional view showing an external device connected to a pad region in FIG. 1C.

According to the present embodiment, the full exposing process is performed about the active region for forming the contact hole and the insulation layer pattern and the exposing process is simultaneously concerning the pad region for forming the opening after the first organic insulation layer is previously formed. Thus, the contact hole and the insulation layer pattern are formed in the active region for forming the reflection electrode and the portion of the first organic insulation layer is selectively removed in the pad region after the developing process. Subsequently, after the second organic insulation layer is coated on the resultant structure, the developing process is executed concerning the active region for forming the contact hole in the second organic insulation layer and the pad region for forming the opening and then, the developing process is performed. Therefore, the step of the organic insulation layer between the pads and the portion adjacent to the pads can be decreased to be lower than the step around the contact hole, thereby greatly reducing the connection failure illustrated in FIG. 2 when the COG, the COF or the FPC is connected to the pads of the LCD device.

Embodiment 3

FIGS. 6A, 6B, 6C and 6D are cross-sectional views for illustrating a process for forming an organic insulation layer according to a third embodiment of the present invention. While the double organic insulation layers are formed in accordance with the first and the second embodiments, a single organic insulation layer is formed to reduce a step in a pad region according to the present embodiment.

Figure 6A:
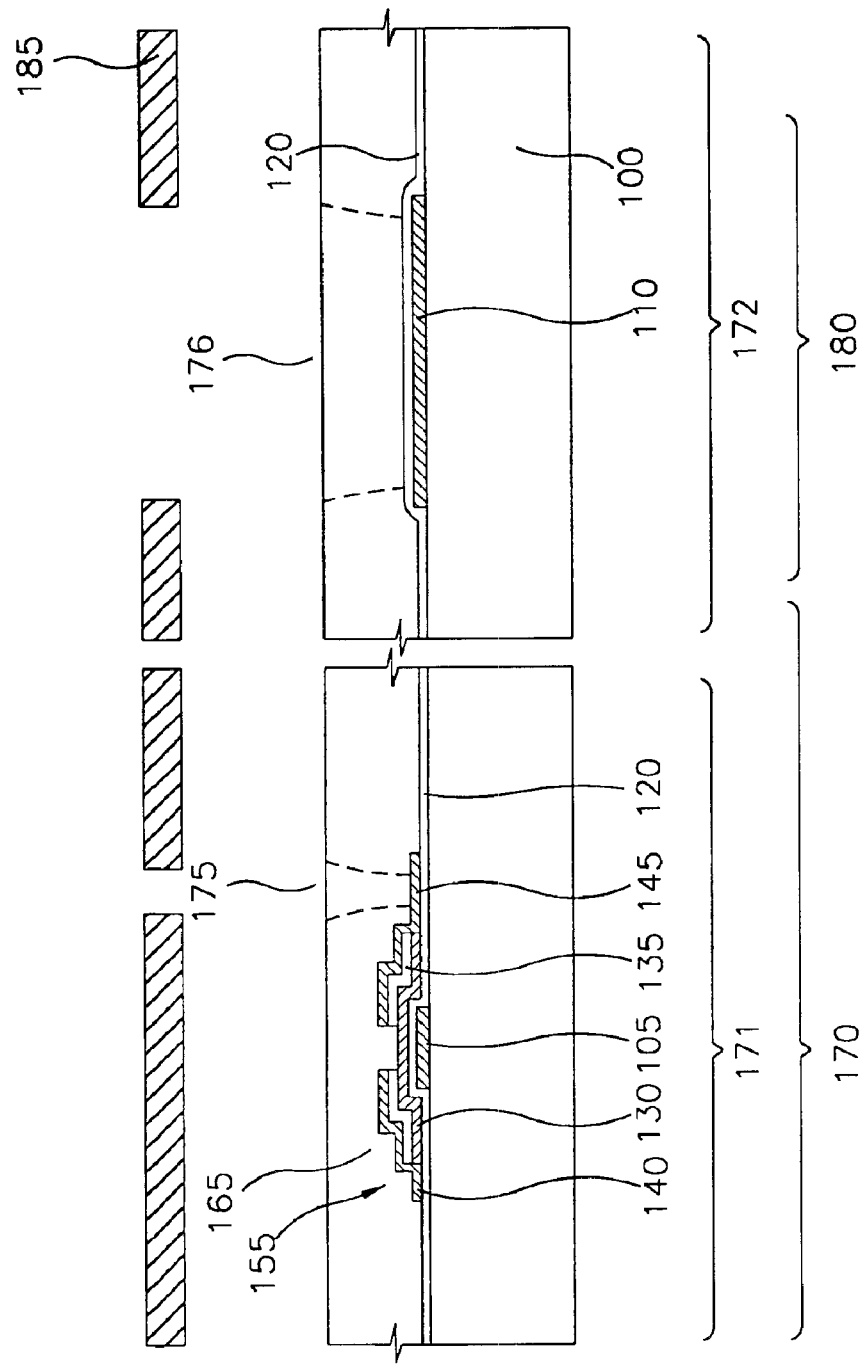

A TFT 155 is formed on a first substrate 100 according to the processes described in FIGS. 4A, 4B and 4C. Referring to FIG. 6A, an organic resist is coated on a first region 170 and a second region 180 of the first substrate 100 having the TFT 155 thereon by the spin coating method to form an organic insulation layer 165 having a thickness of about 2.4 to about 4.0 μm.

Subsequently, after a first mask 185 is positioned over the organic insulation layer 165 for forming a contact hole 175 and an opening 176 respectively exposing a drain electrode 145 of the TFT 155 and a pad 110, a primary exposing process is executed concerning the organic insulation layer 165 with a full exposing amount (that is, a full exposing process for forming the contact hole 175 in the organic insulation layer 165). When the organic insulation layer 165 is developed, the contact hole 175 and the pad opening 176 are simultaneously formed as shown in a dotted line. The contact hole 175 is formed in a pixel region 171 of the first region 170 to expose the drain electrode 145 and the pad opening 176 is formed in the second region 180 to expose the gate and the data input pads 110, 150.

Referring to FIG. 6B, after a second mask 200 for forming a reflection electrode is positioned over the organic insulation layer 165, a secondary exposing process is executed concerning the organic insulation layer 165 in the first region 170 and the whole surface of the second region 180 with a lens exposure amount (namely, the exposing amount for forming lenses of the reflection electrode). In this case, the secondary exposing process is accomplished by a partial exposing method with the lens exposure amount or a slit exposing method.

Then, a rugged structure 205 is formed on the organic insulation layer 165 in the pixel region 171 and the opening 176 is formed in the organic insulation layer 165 positioned in the second region when the exposed organic insulation layer 165 is developed. The opening 176 is formed through removing the organic insulation layer 165 around the pads 110, 150 in the second region 180. Hence, the step between the gate input pad 110 and the portion adjacent to the gate input pad 110 can be reduced because the organic insulation layer 165 is partially removed while preventing shorts between the input pads 110, 150 in the second region 180. Also, the step between the data input pad 150 and the portion adjacent to the data input pad 150 can be minimized while the organic insulation layer 165 partially remains between each of the data input pad 150. At that time, the thickness of the organic insulation layer 165 in the second region is about 0.3 to about 3.0 μm.

The rugged structure 205 on the pixel region 171 includes a plurality of grooves and protrusions and has a height (the depth of the groove or the height of the protrusion) of about 0.5 to about 1.0 μm. The thickness of the organic insulation layer 165 is about 1.0 to about 3.0 μm on the basis of the groove of the rugged structure 205. Hence, the thickness of the organic insulation layer 165 in the pixel region 171 is reduced by about 0.2 to about 1.0 μm on the basis of the protrusion of the rugged structure 205. In this case, the gate and the data input pads 110, 150 are exposed according as the gate insulation layer 120 in the opening 176 of the pad region 180 by a dry etching method.

Referring to FIG. 6C, the reflection electrode 210 is formed by the process described in FIG. 4F. Thus, the reflection electrode 210 in the pixel region 171 has a rugged structure thereon in accordance with the rugged structure 205 of the organic insulation layer 165. At that time, the pad electrode 215 is formed on the gate and the data input pads 110, 150. The pad electrode 215 is higher than the contact hole 175.

FIG. 6D is a cross-sectional view showing a completed LCD device according to the present embodiment. In the same manner as described in FIG. 4G, after a first orientation layer 300 is formed on the resultant structure on the first substrate 100, a second substrate 305 opposed to the first substrate 100 is disposed on the first substrate 100. The second substrate 305 includes a color filter 310, a common electrode 315, a second orientation layer 320, a phase plate 325 and a polarization plate 330.

After a plurality of spacers 335, 336 are interposed between the first substrate 100 and the second substrate 305, a liquid crystal layer 230 in inserted in a space formed between the first and the second substrates 100, 305 by the spacers 335, 336, thereby completing a reflection type or a semi-transmissive type LCD device.

After an anisotropic conductive film 290 including conductive balls 292 is formed on the input pads 110, 150 formed in the pad region 180 of the first substrate 100, a bump 294 of a COG, a COF or an FPC is compressed so as to be connected to the pads 110, 150, thereby accomplishing a reflection type LCD module or a semi-transmissive type LCD module.

As shown in FIG. 6D, in the completed LCD device according to the present embodiment, an insulation layer having a thickness of about 0.5 to about 4.0 μm is formed in the first region 170. In this case, the insulation layer has a thickness of about 0.5 to about 4.0 μm in the pixel region 171 and has a thickness of about 2.5 to about 4.0 μm in the peripheral region around the pixel region 171. Also, the insulation layer having a thickness of about 0.3 to about 3.0 μm is formed in the pad region 172. The rugged structure 205 is formed on the portion of the insulation layer in the pixel region 171 and the opening 176 is formed in the portion of the insulation layer in the pad region 172. At that time, the thickness of the insulation layer in the pixel region 171 may be less than that of the insulation layer in the second region 180 by adjusting the exposing amount during the secondary.

Test of Effect for Improving the Step Between the Pads in Accordance With the Partial Exposing Process An LCD device is manufactured according to the method of the third embodiment of the present invention. The organic insulation layer of the LCD device is about 3.0 to about 4.0 μm thick. The steps between the pads are measured without the partial exposing process or the slit exposing process. The measured steps are shown in table 1.

TABLE 1

| | Data FPC Pad | The First COG Input Pad | The Second COG Input Pad | COG Output Pad |
|---|---|---|---|---|
| step (μm) | 3.4 | 3.4 | 4.0 | 3.2 |

According to the method described in FIG. 5B, the partial exposing process is executed concerning the input and the output pads of the COG by changing the exposure amount. The measured steps between the pads are shown in table 2 after the partial exposing process is performed. In this case, the partial exposing process or the slit exposing process is not performed concerning the pad of the FPC.

TABLE 2

| Partial Exposing Amount (ms) | Data FPC Pad (μm) | The First COG Input Pad (μm) | The Second COG Input Pad (μm) | COG Output Pad (μm) |
|---|---|---|---|---|
| 2500 | 3.40 | 1.36 | 1.60 | 1.18 |
| 2600 | 3.56 | 1.30 | 1.58 | 1.10 |
| 2700 | 3.40 | 1.15 | 1.39 | 0.96 |

TABLE 2-continued

| Partial Exposing Amount (ms) | Data FPC Pad (μm) | The First COG Input Pad (μm) | The Second COG Input Pad (μm) | COG Output Pad (μm) |
| --- | --- | --- | --- | --- |
| 2800 | 3.45 | 1.10 | 1.35 | 0.91 |
| 2900 | 3.48 | 1.03 | 1.26 | 0.82 |
| 3000 | 3.46 | 0.96 | 1.19 | 0.75 |
| 3100 | 3.50 | 0.90 | 1.05 | 0.66 |
| 3200 | 3.48 | 0.80 | 1.00 | 0.60 |

As shown in table 1 and table 2, the steps between the input and the output pads of the COG are greatly reduced and also linearly decreased as the partial exposure amount is increased.

The lens exposure amount corresponds to about 2600 ms for forming the rugged structure on the insulation layer as the lenses. Under such lens exposure amount, the step is reduced by about 1.1 to about 1.6 μm when the insulation layer in the pad region is partially exposed. Therefore, the step between the first and the second region is decreased by about 2.1 to about 2.4 μm in comparison with the conventional manufacturing method in which the partial exposing process is not performed.

According to the present invention, it can be minimized that the height difference between one portion of the organic insulation layer in the pad region and the other portion of the organic insulation layer adjacent to the pad region by exposing and developing single organic insulation layer or double organic insulation layers. Therefore, it can significantly decrease the connection failure between the pads of the LCD device and the COG, the COF, the FPC when the COG, the COF, the FPC is compressed to the pads of the LCD device.

Also, the electrical short between the pads of the LCD device can be prevented since the organic insulation layer remains between the pads while the step between the pads is greatly decreased.

Furthermore, the step in the pad region can be minimized without performing another process for reducing the step since that the height difference between the height difference between one portion of the organic insulation layer in the pad region and the other portion of the organic insulation layer adjacent to the pad region is reduced when the organic insulation layer is exposed and developed so as to from the contact hole and the reflection electrode.

In the above-described embodiments of the present invention, the reflection type or the semi-transmissive type LCD device is manufactured, however, any display device having a thick insulation layer and a pad electrode may be manufactured according to the method of the present invention. For example, a transmission type LCD device may be manufactured by the method of the above-described methods of the present invention.

Although the preferred embodiments of the present invention have been described in detail with reference to drawings and specific terms have been used, the present invention is not limited to the above-described embodiments and various modifications may be evidently effected by one skilled in the art within the scope and spirit of the present invention.

What is claimed is:

1. A display device, comprising:
    a substrate comprising:
        a pixel region having a pixel for producing an image, the pixel comprising a thin film transistor as a switching device; and
        a peripheral region adjoining the pixel region and having a pad connected to the pixel for applying an electrical signal to the pixel, wherein the pad is a gate pad or a data pad;
    a photosensitive layer formed on the pixel region and the peripheral region; and
    an opening region formed in the peripheral region,
    wherein the photosensitive layer has a first thickness in the opening region and a second thickness in the peripheral region except for the opening region, the first thickness being smaller than the second thickness.

2. The display device of claim 1, wherein the pad is formed in the opening region and the opening region has a periphery greater than that of the pad.

3. The display device of claim 2, wherein the second thickness is about 0.3 to about 3.0 μm.

4. The display device of claim 2, wherein a difference between the second thickness and the first thickness is about 2.1 to about 2.4 μm.

5. The display device of claim 1, wherein a rugged structure is formed on the photosensitive layer in the pixel region.

6. The display device of claim 5, wherein a thickness of the photosensitive layer in the pixel region is no more than the second thickness.

7. The display device of claim 1, wherein the photosensitive layer comprises:
    a first organic insulation layer formed in the pixel region and the peripheral region except for the opening region; and
    a second organic insulation layer formed in the pixel region and the peripheral region including the opening region,
    wherein the second organic insulation layer has a rugged structure in the pixel region and an opening formed in the opening region and exposing the pad.

8. The display device of claim 1, wherein the insulation layer comprises:
    a first insulation layer having a reflective electrode pattern in the pixel region and a peripheral pattern in the peripheral region; and
    a second insulation layer covering the first insulation layer and having a rugged structure in the pixel region and an opening exposing the pad in the opening region, wherein the second insulation layer is continuously expanded from the pixel region to the peripheral region.

9. A reflection type liquid crystal display (LCD) device, comprising:
    a first substrate having a first region and a second region wherein the first region includes a pixel region on the first substrate where a pixel is formed to produce an image and a peripheral region surrounding the pixel region and a pad connected to the pixel is formed on the second region for applying an electrical signal to the pixel from outside;

a second substrate opposed to the first substrate;

a liquid crystal layer formed between the first substrate and the second substrate;

a reflection electrode formed at the central portion of the first substrate, the reflection electrode having a rugged structure comprising a relatively high portion and a relatively low portion; and an organic insulation layer formed between the first substrate and the reflection electrode and formed in the first region and the second regions wherein the organic insulation layer has a rugged structure identical to the rugged structure of the reflection electrode at a central portion of the first region and an opening in the second region to expose the pad, and a second thickness of the organic insulation layer around the opening is less than a first thickness of the organic insulation layer in the peripheral region.

10. The reflection type LCD device of claim 9, wherein the rugged structure comprises a plurality of protrusions and a plurality of grooves.

11. The reflection type LCD device of claim 9, wherein the second thickness is about 0.3 to about 3.0 $\mu$m.

12. The reflection type LCD device of claim 9, wherein a difference between the second thickness and the first thickness is about 2.1 to about 2.4 $\mu$m.

13. The reflection type LCD device of claim 9, wherein a thickness of the organic insulation layer in the pixel region is no greater than the second thickness.

14. A method for manufacturing a display device, comprising steps of:

forming a pixel in a pixel region of a substrate, the pixel including a thin film transistor as a switching device;

forming a pad in a peripheral region of the substrate, wherein the pad is a gate pad or a data pad;

forming a photosensitive layer over the pixel region and the peripheral region; and patterning the photosensitive layer to form an opening region in the peripheral region such that the photosensitive layer has a first thickness in the opening region and a second thickness in the peripheral region except for the opening region, the first thickness being smaller than the second thickness.

15. The method of claim 14, wherein the pad is formed within in the opening region and the opening region has a periphery greater than that of the pad.

16. The method of claim 14, further comprising a step of forming a reflection electrode on the photosensitive layer in the pixel region and forming a pad electrode on the pad in the opening region.

17. The method of claim 16, wherein the reflection electrode and the pad electrode are simultaneously formed by coating a metal layer composed of a reflective metal on the photosensitive layer and by patterning the metal layer.

18. The method of claim 14, wherein the step of forming the photosensitive layer comprises steps of:

forming a first insulation layer on the substrate;

selectively removing the first insulation layer in the opening region;

forming a second insulation layer in the pixel region and in the peripheral region; and forming an opening exposing the pad in the second insulation layer in the opening region.

19. The method of claim 18, wherein the first insulation layer and the second insulation layer are organic resists.

20. The method of claim 18, wherein the step of selectively removing the first insulation layer in the opening region comprises:

forming a contact hole in the first insulation layer for connecting the pixel;

full exposing the first insulation layer with an exposure amount for forming the contact hole after a first mask is positioned over the first insulation layer to remove the first insulation layer; and developing the exposed first insulation layer.

21. The method of claim 18, wherein the step of forming the opening in the second insulation layer comprises steps of:

forming a rugged structure on the second insulation layer after a second mask is positioned over the second insulation layer;

exposing the second insulation layer with an exposure amount identical to an exposure amount for forming the rugged structure after the second mask for forming the opening is positioned over the second insulation layer; and developing the exposed second insulation layer.

22. The method of claim 14, wherein the step of forming the photosensitive layer comprises steps of:

forming a first insulation layer on the pixel region and the peripheral region;

patterning the first insulation layer to form a first insulation pattern and a contact hole in the pixel region and to selectively remove the first insulation layer in the opening region;

forming a second insulation layer in the pixel region and the peripheral region; and forming an opening in the second insulation layer in the opening region.

23. The method of claim 22, wherein the step of patterning the first insulation layer comprises steps of:

positioning a first mask on the first insulation layer for forming a rugged structure and a contact hole;

exposing the first insulation layer with an exposure amount for forming the contact hole; and developing the exposed first insulation layer.

24. The method of claim 23, wherein the step of forming the opening comprises steps of:

positioning a second mask over the second insulation layer for forming the contact hole and the opening;

exposing the second insulation layer; and developing the exposed second insulation layer.

25. The method of claim 14, wherein the step of forming the photosensitive layer comprises steps of:

forming an organic insulation layer on the substrate;

primarily exposing the organic insulation layer with a full exposure amount for removing the organic insulation layer on the pad;

partially exposing the organic insulation layer in the opening region; and forming an opening in the opening region and partially removing the organic insulation layer around the opening in the opening region by developing the exposed organic insulation layer.

26. The method of claim 25, wherein the step of primarily exposing the organic insulation layer comprises steps of:

positioning a first mask over the organic insulation layer; and exposing the organic insulation layer with a full exposure amount for forming the opening and a contact hole for electrically connecting the pixel.

27. The method of claim 26, wherein the step of exposing the organic insulation layer is performed by exposing the organic insulation layer and the second region with a lens exposure amount for forming a reflection electrode on the organic insulation layer.

28. A display device comprising:
a substrate comprising:
   a pixel region having a pixel formed thereon and a peripheral region; and
   a peripheral region having a pad connected to the pixel, wherein the peripheral region has an opening region and the pad is formed within the opening region;
a first insulating layer formed over the pixel region including the pixel and the peripheral region except for the opening region, the first insulating layer fully exposing the pad; and
a second insulating layer formed on the pixel region and the peripheral region including the opening region and having an opening exposing the pad.

29. The display device of claim 28, further comprising a rugged structure formed on a surface of the second insulation layer.

30. The display device of claim 28, wherein the first insulation layer includes a plurality of grooves, and the second insulation layer has a rugged surface.

31. A method of manufacturing a display device, comprising steps of:
forming a pixel in a pixel region of a substrate;
forming a pad in a peripheral region of the substrate, wherein the peripheral region has an opening region and the pad is formed within the opening region, the pad electrically connected to the pixel;
forming a first insulation layer on the pixel region and peripheral region;
removing a portion of the first insulation layer in the opening region to fully expose the pad;
forming a second insulation layer on the first insulation layer and the opening region; and
removing a portion of the second insulation layer to form an opening for exposing the pad.

32. The method of claim 31, further comprising a step of forming a rugged structure on a surface of the second insulation layer.

33. The method of claim 31, wherein the step of forming a first insulating layer comprises forming a plurality of grooves therein.

34. A display device, comprising:
a substrate comprising:
a pixel region having a pixel; and
a peripheral region adjoining the pixel region and having a pad electrically connected to the pixel; and
an insulation layer formed on the pixel region and the peripheral region, the insulation layer having an opening formed in the peripheral region to expose the pad; and
a bump forming electrical contact with the pad in the opening,
wherein the opening has a periphery larger than that of the bump.

35. The display device of claim 34, further comprising a conductive film having a plurality of conductive balls and forming electrical contact between the bump and the pad.

36. A method for manufacturing a display device, comprising steps of:
forming a pixel in a pixel region of a substrate;
forming a pad in a peripheral region of the substrate;
forming an insulation layer on the pixel region and the peripheral region; and
removing a portion of the insulation layer in the peripheral region to form an opening exposing the pad;
electrically connecting a bump to the pad in the opening, wherein the opening has a periphery greater than that of the bump.

37. A display device, comprising:
a substrate comprising:
a pixel region having a pixel; and
a peripheral region adjoining the pixel region and having a pad electrically connected to the pixel;
an insulation layer formed on the pixel region and the peripheral region and having an opening formed in the peripheral region to expose the pad; and
a bump electrically connected to the pad in the opening, wherein an upper surface of the insulation layer is not lower than a lower surface of the bump.

* * * * *